US008368658B2

(12) United States Patent
Brisebois et al.

(10) Patent No.: US 8,368,658 B2
(45) Date of Patent: Feb. 5, 2013

(54) AUTOMATIC SOFT KEY ADAPTATION WITH LEFT-RIGHT HAND EDGE SENSING

(75) Inventors: Arthur Brisebois, Cumming, GA (US); Robert S. Klein, Manchester, CT (US)

(73) Assignee: AT&T Mobility II LLC, Atlanta, GA (US)

( * ) Notice: Subject to any disclaimer, the term of this patent is extended or adjusted under 35 U.S.C. 154(b) by 1055 days.

(21) Appl. No.: 12/326,172

(22) Filed: Dec. 2, 2008

(65) Prior Publication Data

US 2010/0134423 A1    Jun. 3, 2010

(51) Int. Cl.
*G06F 3/041* (2006.01)
*G09G 5/00* (2006.01)

(52) U.S. Cl. ........................................ 345/173; 345/156

(58) Field of Classification Search .......... 345/156–184, 345/104; 178/18.01–20.04; 715/863
See application file for complete search history.

(56) References Cited

U.S. PATENT DOCUMENTS

| | | | |
|---|---|---|---|
| 5,483,601 A | 1/1996 | Faulkner | |
| 6,611,253 B1 | 8/2003 | Cohen | |
| 7,159,194 B2 | 1/2007 | Wong et al. | |
| 2001/0044318 A1 | 11/2001 | Mantyjarvi et al. | |
| 2002/0103616 A1 | 8/2002 | Park et al. | |
| 2002/0115469 A1 | 8/2002 | Rekimoto et al. | |
| 2003/0037150 A1 | 2/2003 | Nakagawa | |
| 2003/0179178 A1 | 9/2003 | Zargham | |
| 2004/0204016 A1 | 10/2004 | Sakamoto | |
| 2004/0240383 A1 | 12/2004 | Davolos et al. | |
| 2005/0014509 A1 | 1/2005 | Semper et al. | |
| 2005/0035955 A1 | 2/2005 | Carter et al. | |
| 2005/0094560 A1 | 5/2005 | Montes Linares | |
| 2005/0136842 A1 | 6/2005 | Fan et al. | |
| 2005/0180397 A1 | 8/2005 | Yeom | |
| 2006/0105817 A1 | 5/2006 | Naick et al. | |
| 2006/0148490 A1 | 7/2006 | Bates et al. | |
| 2006/0197750 A1 | 9/2006 | Kerr et al. | |
| 2006/0224046 A1 | 10/2006 | Ramadas et al. | |
| 2006/0238517 A1 | 10/2006 | King et al. | |
| 2007/0002016 A1 | 1/2007 | Cho et al. | |
| 2007/0037605 A1 | 2/2007 | Logan | |
| 2007/0070050 A1* | 3/2007 | Westerman et al. | 345/173 |
| 2007/0133428 A1 | 6/2007 | Taylor et al. | |
| 2007/0259673 A1 | 11/2007 | Willars et al. | |

(Continued)

OTHER PUBLICATIONS

Non-Final OA for U.S. Appl. No. 12/326,193, dated Jul. 15, 2011, 28 pages.

(Continued)

*Primary Examiner* — Alexander Eisen
*Assistant Examiner* — Patrick F Marinelli
(74) *Attorney, Agent, or Firm* — Turocy & Watson, LLP

(57) ABSTRACT

Systems and methodologies for adapting input/output operation of an electronic device for left-handed and/or right-handed scenarios are provided herein. As described herein, sensors (e.g., capacitive, resistive, touch-sensitive, etc.) are applied to respective outer edges of a device to determine whether a device is in a user's left hand and/or right hand. Based on this determination, respective points along the sensors can be mapped to soft keys to automatically optimize input for left-handed and/or right-handed operation. As further described herein, points of contact with an input device such as a touch-screen can be corrected based on whether a user's left hand and/or right hand is holding an associated electronic device. For example, upon identifying contact between a touch-screen and a thumb of a hand being used to hold an associated device, the point of contact can be shifted to compensate for the angle of the thumb with respect to the touch-screen.

16 Claims, 16 Drawing Sheets

U.S. PATENT DOCUMENTS

| | | |
|---|---|---|
| 2007/0279332 A1 | 12/2007 | Fryer et al. |
| 2007/0294410 A1 | 12/2007 | Pandya et al. |
| 2008/0133599 A1 | 6/2008 | Stewart et al. |
| 2008/0136784 A1 | 6/2008 | Neoh et al. |
| 2008/0229409 A1 | 9/2008 | Miller et al. |
| 2009/0051661 A1* | 2/2009 | Kraft et al. .................. 345/173 |
| 2009/0195959 A1* | 8/2009 | Ladouceur et al. ........ 361/283.1 |
| 2009/0262078 A1 | 10/2009 | Pizzi |
| 2010/0081374 A1 | 4/2010 | Moosavi |
| 2010/0138680 A1 | 6/2010 | Brisebois et al. |
| 2010/0167693 A1 | 7/2010 | Yamada |
| 2010/0214216 A1 | 8/2010 | Nasiri et al. |

OTHER PUBLICATIONS

Non-Final OA for U.S. Appl. No. 12/326,157, dated Feb. 10, 2011, 18 pages.

Final OA for U.S. Appl. No. 12/326,157, dated Jun. 24, 2011, 18 pages.

OA dated Oct. 25, 2011 for U.S. Appl. No. 12/326,193, 43 pages.

OA dated Mar. 27, 2012 for U.S. Appl. No. 12/326,193, 39 pages.

OA dated Mar. 27, 2012 for U.S. Appl. No. 12/326,157, 26 pages.

Office Action dated Jul. 31, 2012 for U.S. Appl. No. 12/326,157, 21 pages.

Office Action dated Jul. 16, 2012 for U.S. Appl. No. 12/326,193, 48 pages.

* cited by examiner

AUTOMATIC SOFT KEY ADAPTATION WITH LEFT-RIGHT HAND EDGE SENSING

TECHNICAL FIELD

The following disclosure relates generally to portable electronic devices, and more particularly to techniques for providing input to a portable electronic device.

BACKGROUND

As handheld electronic devices, such as mobile telephone handsets, electronic game controllers, and the like, increase in prevalence and increase in processing power, displays for such devices are becoming larger, more complex, and more power-hungry. For example, many existing electronic devices are equipped with touch-screens to facilitate the entry of input despite the size-constrained nature of the associated devices. However, touch-screens and similar input mechanisms utilize a large amount of power for both output (e.g., lighting) and input activity, which results in reduced battery life for devices that utilize such mechanisms. Further, existing electronic devices generally rely on an activity-based and/or time-based mechanism to determine whether to provide lighting to a device display, which can result in additional excess power usage during periods where a user is not actively engaged in viewing the display and/or otherwise actively using the device.

In addition, due to the limited form factor of handheld electronic devices, controls (e.g., buttons, dials, etc.) for such devices are traditionally either optimized for only one of left hand use or right hand use or configured such that manual intervention is required to change from a left-handed orientation to a right-handed orientation or vice versa. As a result, traditional handheld device controls can lead to reduced usability, a loss in functionality, and/or potential safety risks (e.g., safety risks caused by a user being required to swap hands while driving). While some existing electronic devices utilize mechanisms such as level and/or orientation sensing for control adaptation, these existing mechanisms do not perform well in scenarios where a device is held substantially vertical or flat. Accordingly, it would be desirable to implement input/output mechanisms for handheld devices that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate automatic soft key adaptation for a handheld electronic device. In accordance with various aspects described herein, sensors and/or other suitable means can be employed by a handheld electronic device to determine whether the device is in a user's left hand and/or a user's right hand. Based on the result of this determination, respective points along the sensors can be mapped to soft keys to automatically optimize input for left-handed and/or right-handed operation. In one example, the above is accomplished by monitoring sensors located at opposite edges of a device to determine whether the respective edges of the device are in contact with a user's fingers or in contact with a user's thumb and/or palm. Discovered locations of a user's fingers and/or thumb can then be leveraged to map the sensors to various soft keys, thereby enabling input to be efficiently and intuitively provided to the device with the hand(s) being used to hold the device.

In accordance with another aspect, knowledge of the hand(s) being used to hold an electronic device can be further leveraged to correct points of contact with an input device such as a touch-screen. For example, upon determining that contact has been made with a touch-screen, a device can determine which of a user's hands are being used to hold the device and whether a thumb at a hand being used to hold the device made the contact. If it is determined that a thumb on a hand being used to hold the device was used, the point of contact with the touch-screen can be shifted to compensate for natural error caused by the angle of the thumb with respect to the touch-screen. In another example, the touch-screen can be split into multiple zones to compensate for multiple angles of contact (e.g., if it is determined that the user is holding a device in both hands).

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
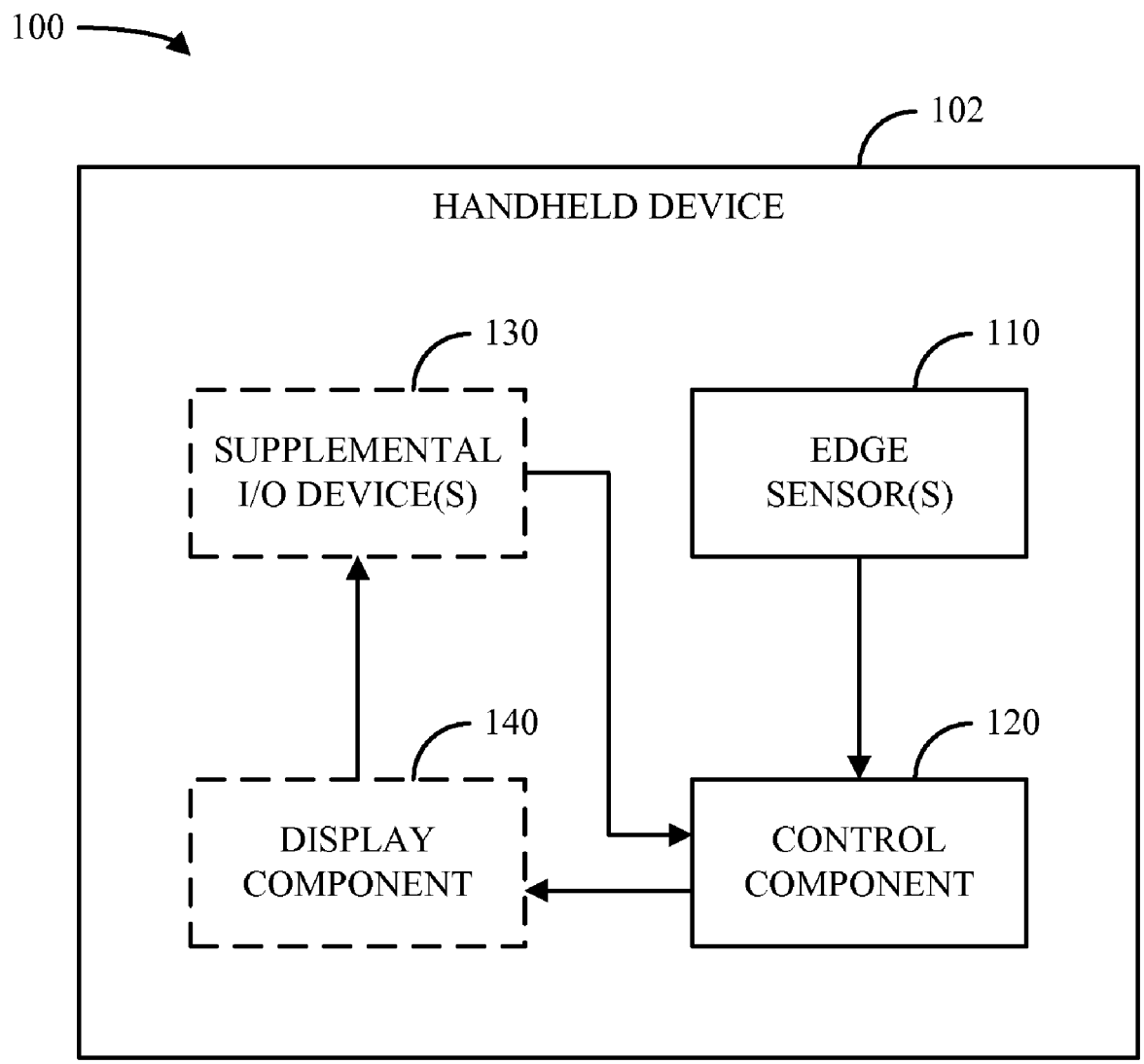
FIG. 1 is a block diagram of a system for controlling a handheld device in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, it is to be appreciated that while various drawings are provided herein to illustrate respective example embodiments of the claimed subject matter, the embodiments illustrated herein are not necessarily to be construed as preferred or advantageous over other aspects or designs, nor are they meant to preclude equivalent structures and techniques known to those of ordinary skill in the art. Furthermore, it is to be appreciated that the various drawings are not drawn to scale from one figure to another nor inside a given figure, and in particular that the size of the components are arbitrarily drawn for facilitating the reading of the drawings.

Referring now to the drawings, FIG. 1 illustrates a block diagram of a system 100 for controlling a handheld device 102 in accordance with various aspects described herein. It can be appreciated that handheld device 102 illustrated by FIG. 1 can be any suitable device, such as portable and/or non-portable electronic devices or the like. Examples of handheld devices 102 that can be utilized include, but are not limited to, mobile telephone handsets, electronic game systems and/or game controllers, musical instruments, Global Positioning System (GPS) receivers, Personal Digital Assistants (PDAs), smartphones, package tracking devices, laptop and/or tablet computers, virtual reality systems, and/or any other appropriate type of device.

In accordance with one aspect, handheld device 102 can include one or more edge sensors 110 to provide improved input functionality by facilitating additional control options in a limited amount of space provided at the device 102. For example, edge sensor(s) 110 can be applied to one or more side and/or back edges of a device, thereby allowing inputs normally associated with a touch-screen and/or a mechanical button, dial, or other control to be implemented using the sides of the device 102. As a result, input functions conventionally executed by controls at the front of a device can be moved to traditionally unused space at the sides and/or back of the device, which in turn can facilitate the use of larger device display areas at the front of the device and entry of user input without obstructing the display area (e.g., by engaging a touch-screen). In addition, it can be appreciated that edge sensors 110 can provide input functionality similar to that achieved by conventional mechanisms such as touch-screens without the power requirements ordinarily associated with such mechanisms.

In accordance with one aspect, edge sensors 110 can utilize capacitive, resistive, touch-sensitive, and/or any other suitable sensing technology to detect the presence and/or motion of a user's fingers and/or hands with respect to the edges of an associated device 102. For example, edge sensors 110 can be utilized to monitor the presence or absence of skin contact at various points along the edges of a handheld device. Further, when presence of skin contact is detected, various parameters of various contact points, such as the location, width, spacing, count, pressure, and/or movement of the contact points, can be utilized by the edge sensors 110 to infer the presence and location of a user's hands and/or fingers along the edges of the device 102. In one example, this information can be provided to a control component 120, which can facilitate the control of one or more features and/or applications executed by the device 102. For example, the control component 120 can facilitate a mapping of various points along edge sensor(s) 110 to respective soft keys, which can be manipulated by a user to control operation of the device 102.

In accordance with another aspect, inputs provided by edge sensor(s) 110 can be utilized by the control component 120 in combination with one or more optional supplemental input/output (I/O) device 130, such as a keyboard, numeric keypad, touch-screen, trackball, keyboard, mouse, etc., to provide input for one or more applications and/or features of the device 102. In another example, the control component 120 can manage an optional display component 140 to provide visual information relating to one or more applications and/or features of a handheld device 102 being executed by a user.

Figure 2:
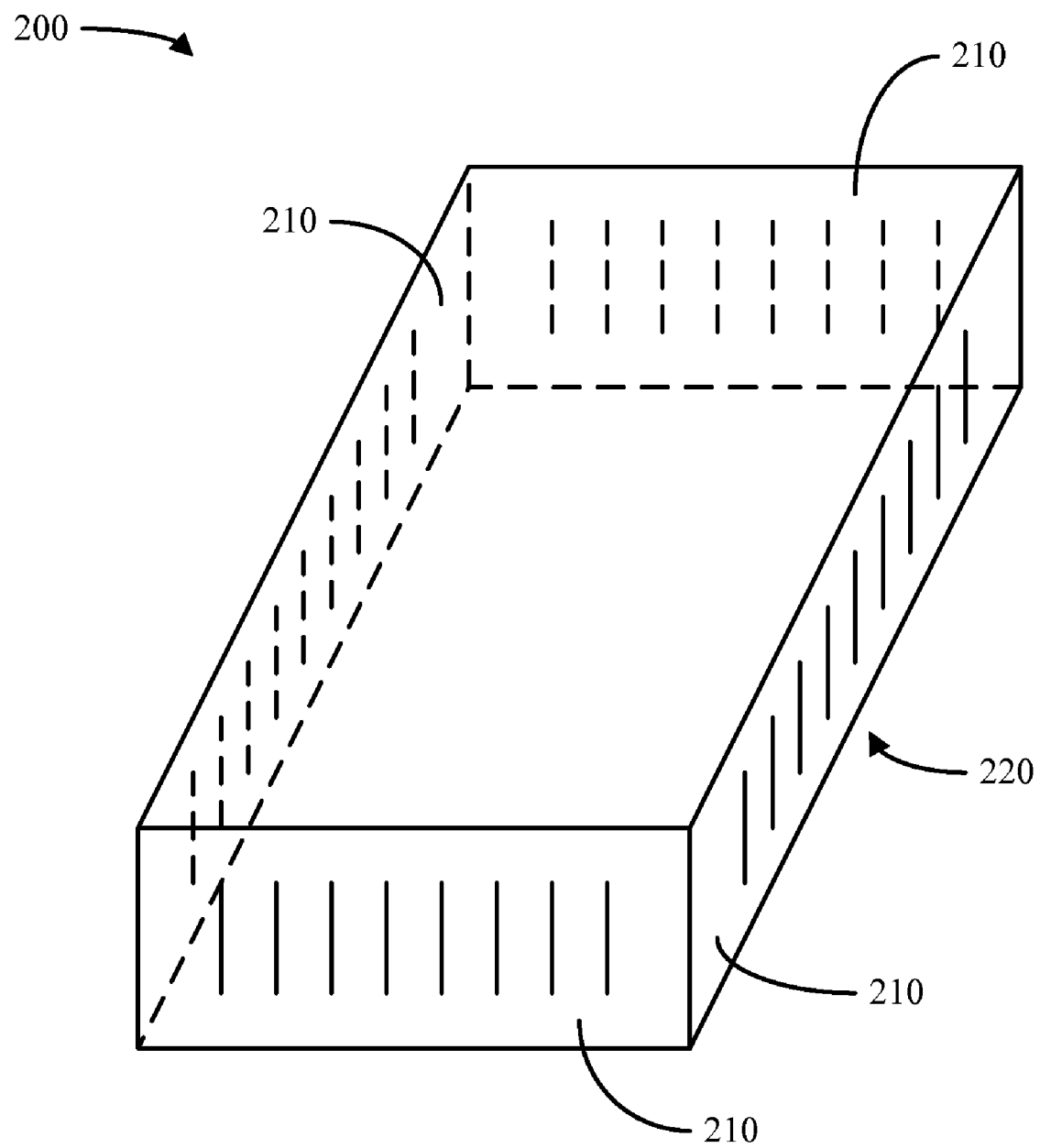
FIG. 2 illustrates an example sensor implementation for an electronic device in accordance with various aspects.

Turning now to FIG. 2, a diagram 200 is provided that illustrates an example sensor implementation for an electronic device (e.g., handheld device 102) in accordance with various aspects. In one example, a device as illustrated by diagram 200 can be provided, to which one or more edge sensors 210 can be affixed and/or otherwise placed at the side edges of the device. Additionally and/or alternatively, a back sensor 220 can be placed at the back edge of the device.

In accordance with one aspect, side sensors 210 and/or a back sensor 220 can be faceted, such that a plurality of touch points are provided along the length of each sensor 210 and/or 220. As illustrated in diagram 200, touch points at side sensors 210 are divided by vertical lines along each sensor 210. Additionally and/or alternatively, it can be appreciated that touch points could also be implemented across the width of the sensors 210 and/or 220, thereby creating a two-dimensional array of touch points across each sensor 210 and/or 220.

In accordance with another aspect, edge sensors 210 and/or back sensor 220 can be implemented using any suitable sensing technology or combination of technologies, such as capacitive sensing, resistive sensing, touch or pressure sensing, and/or any other suitable sensing technology that can be placed along the edges of an associated device as illustrated by diagram 200. While various example implementations are described herein in the context of capacitive sensing, it should be appreciated that capacitive sensing is only one implementation that can be utilized and that, unless explicitly stated otherwise in the claims, the claimed subject matter is not intended to be limited to such an implementation.

As illustrated by diagram 200, sensors 210 and 220 can be placed along the side and back edges of an associated device, respectively, in order to allow the sides and/or back of an electronic device to be utilized for providing input to the device. Accordingly, it can be appreciated that the sensor implementation illustrated by diagram 200 can facilitate user input without requiring a user to obstruct a display area located at the front of a device to enter such input, in contrast to conventional input mechanisms such as touch-screens or mechanical controls located at the front of a device. Further, side sensor(s) 210 and/or back sensor 220 can additionally be utilized to detect and monitor a plurality of contacts simultaneously, thereby facilitating a rich, intuitive user input experience that is similar to that associated with multi-touch touch-screens and other similar input mechanisms without incurring the cost traditionally associated with such input mechanisms. Moreover, due to the rich, intuitive user input experience provided by sensors 210 and/or 220, various applications can be enabled at an associated device that would otherwise be impractical for a handheld device.

Figure 3:
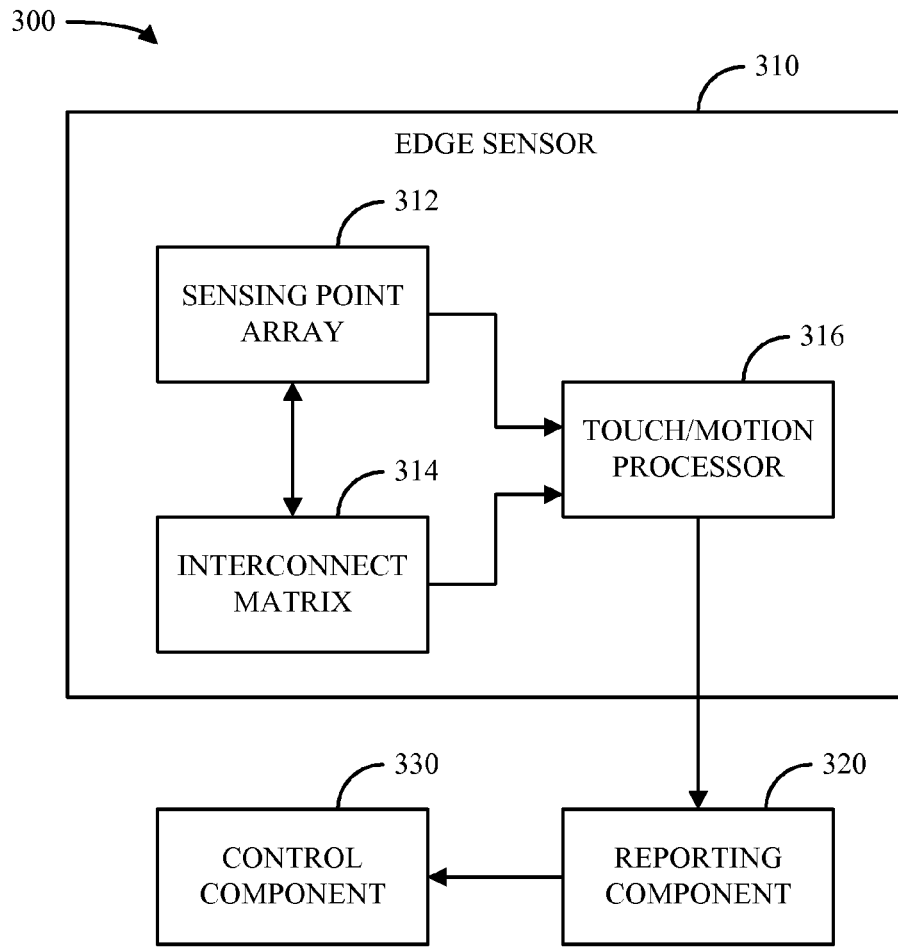
FIG. 3 is a block diagram of a system for controlling a handheld device in accordance with various aspects.

Referring now to FIG. 3, a system 300 for controlling a handheld device in accordance with various aspects is illustrated. In one example, system 300 can include an edge sensor 310, which can be applied to one or more outer edges of an associated device as generally described herein. In accordance with one aspect, edge sensor 310 can include one or more sensing points arranged in a linear array 312 and an interconnection matrix 314 that joins the sensing points in the array 312.

In one example, edge sensor 310 can be segmented as illustrated by diagram 200 such that various sensing points in the sensing point array 312 correspond to respective locations along the edge sensor 310. Accordingly, the sensing point array 312 and/or interconnection matrix 314 can be monitored by a touch and motion processor 316 that detects and reports the presence or absence of skin contact (e.g., from a user's hands and/or fingers) at various points along the edge sensor 310 based on changes in capacitance, resistance, pressure, or the like observed at the sensing points. In accordance with one example, a reporting component 320 can be utilized to report information obtained by the touch and motion processor 316 to a control component 330, which can in turn utilize the information as input for one or more applications.

In one example, touch and motion processor 316 can monitor relationships between adjacent sensing points, the grouping of contacts, separation of contact points, a number of detected contact points, and/or other similar observations to detect the presence and/or positioning of the hands and/or fingers of a user relative to the edge sensor 310. Techniques by which the touch and motion processor 316 can perform such monitoring and detection are described in further detail infra.

Figure 4:
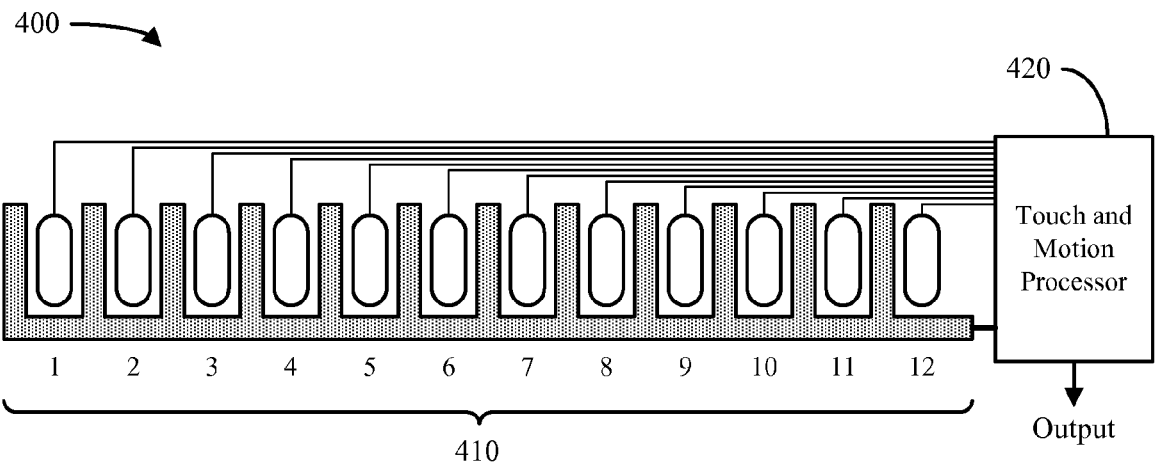
FIGS. 4-5 illustrate example implementations of an edge sensor in accordance with various aspects.

Turning to FIG. 4, a diagram 400 is provided that illustrates an example edge sensor that can be implemented in accordance with various aspects described herein. As diagram 400 illustrates, an edge sensor can include an array of sensing points 410, which can be joined by an interconnection matrix and/or coupled to a touch and motion processor 420. In accordance with one aspect, sensing points 410 can utilize changes in capacitance, resistance, pressure, and/or any other suitable property or combination of properties to sense the presence or absence of skin contact with the sensing points 410. Diagram 400 illustrates an array of 12 sensing points 410 for purposes of clarity of illustration; however, it should be appreciated that any number of sensing points 410 can be utilized in conjunction with an edge sensor as described herein.

In one example, the touch and motion processor 420 can utilize information obtained from one or more sensing points 410 and/or a related interconnection matrix to measure and report edge contact presence, location, width, spacing, count, pressure, movement, and/or any other suitable property on a periodic basis (e.g., via a reporting component 320). These reports can subsequently be used by various applications at an associated device (e.g., via a control component 330) that are configured to utilize control inputs from a device edge associated with the sensor illustrated by diagram 400. For example, one or more applications can utilize information reported from the touch and motion processor 420 to control soft keys that are mapped to respective portions of the sensing points 410, as described in further detail infra.

By way of specific, non-limiting example, the sensing points 410 can utilize capacitive sensing such that respective sensing points 410 exhibit a capacitance when in contact with human skin (e.g., from a user's hand and/or fingers). Based on these capacitances and changes thereto, the touch and motion processor 420 can determine relationships between adjacent sensing points 410, grouping between contacts, separation between contact points, the number of detected contacts, and/or other appropriate factors for determining the presence, location, and/or movement of the hands and/or fingers of a user with respect to the sensor.

Figure 5:
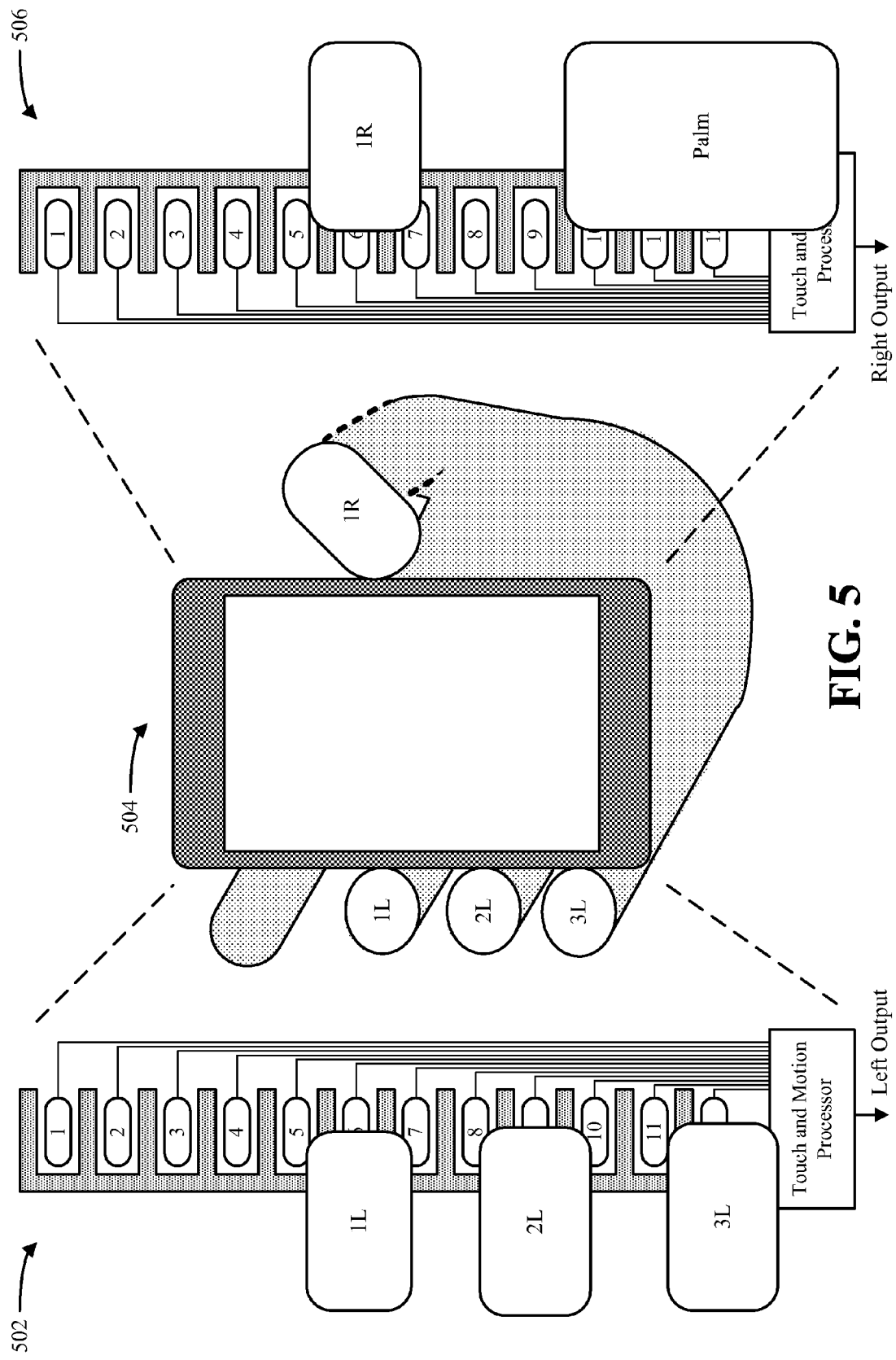

An example application of the edge sensor illustrated by diagram 400 is provided in FIG. 5. In accordance with one aspect, FIG. 5 illustrates an example portable device having edge sensors along the left and right edges of the device. More particularly, diagram 504 illustrates a front view of the device, while diagrams 502 and 506 respectively provide detailed illustrations of the left and right edge sensors employed on the device. While detail view diagrams 502 and 506 illustrate respective edge sensors having 12 touch points, it should be appreciated that any suitable number of touch points can be utilized and that respective sensors utilized with a common device can have uniform and/or non-uniform numbers of associated touch points. Further, it should be appreciated that while a generic electronic device is illustrated in diagram 504 for simplicity, the implementations illustrated by FIG. 5 could be utilized for any suitable electronic device, such as, for example, a mobile telephone handset, an electronic game system and/or game controller, a musical instrument (e.g., an electronic keyboard, guitar, etc.), a GPS receiver, a PDA, a smartphone, a package tracking device (e.g., a barcode scanner), a computer (e.g., a desktop, laptop, and/or tablet computer), a virtual reality device, and/or any other appropriate type of device.

As the front view diagram 504 illustrates, a user can hold the portable device with his right hand, such that the thumb, denoted as 1R, and palm of the user rest against the right side of the device while three fingers of the user, denoted as 1L-3L, rest against the left side of the device. Accordingly, as shown in left detail view diagram 502, the three fingers of the user resting against the left side of the device can contact sensing points on the left sensor implemented on the device, which can in turn cause a change in the properties of the contacted sensing points. Based on these changes in properties, a touch and motion processor for the left edge sensor can determine the number, spacing, width, and/or other properties of each contact, from which it can infer that the user has rested his fingers against the left side of the device. In one example, information relating to user contact with the left edge sensor can be relayed as left sensor output to one or more other components of the device to be utilized as input and/or for further processing.

Similarly, as illustrated by right side detail view diagram 506, a touch and motion processor for the right edge sensor can detect changes in the properties of sensing points at which the user's thumb and/or palm have contacted the right edge of the device. Based on these detected changes, the touch and motion processor for the right edge sensor can determine information relating to user contact with the right edge sensor and relay this information as output for input to one or more applications and/or for further processing.

While the left and right edge sensors are illustrated in FIG. 5 as having separate touch and motion processors, it should be appreciated that one or more sensors associated with an electronic device can share a common touch and motion processor. Further, it should be appreciated that the functionality of the touch and motion processor(s) as illustrated by FIG. 5 could also be implemented using any other suitable component(s) of an associated device, such as one or more generalized processing units provided for an electronic device. In a common processor implementation, it can additionally be appreciated that separate outputs can be provided for each sensor monitored by a processor, or alternatively outputs from a plurality of sensors can be combined into a common output.

Figure 6:
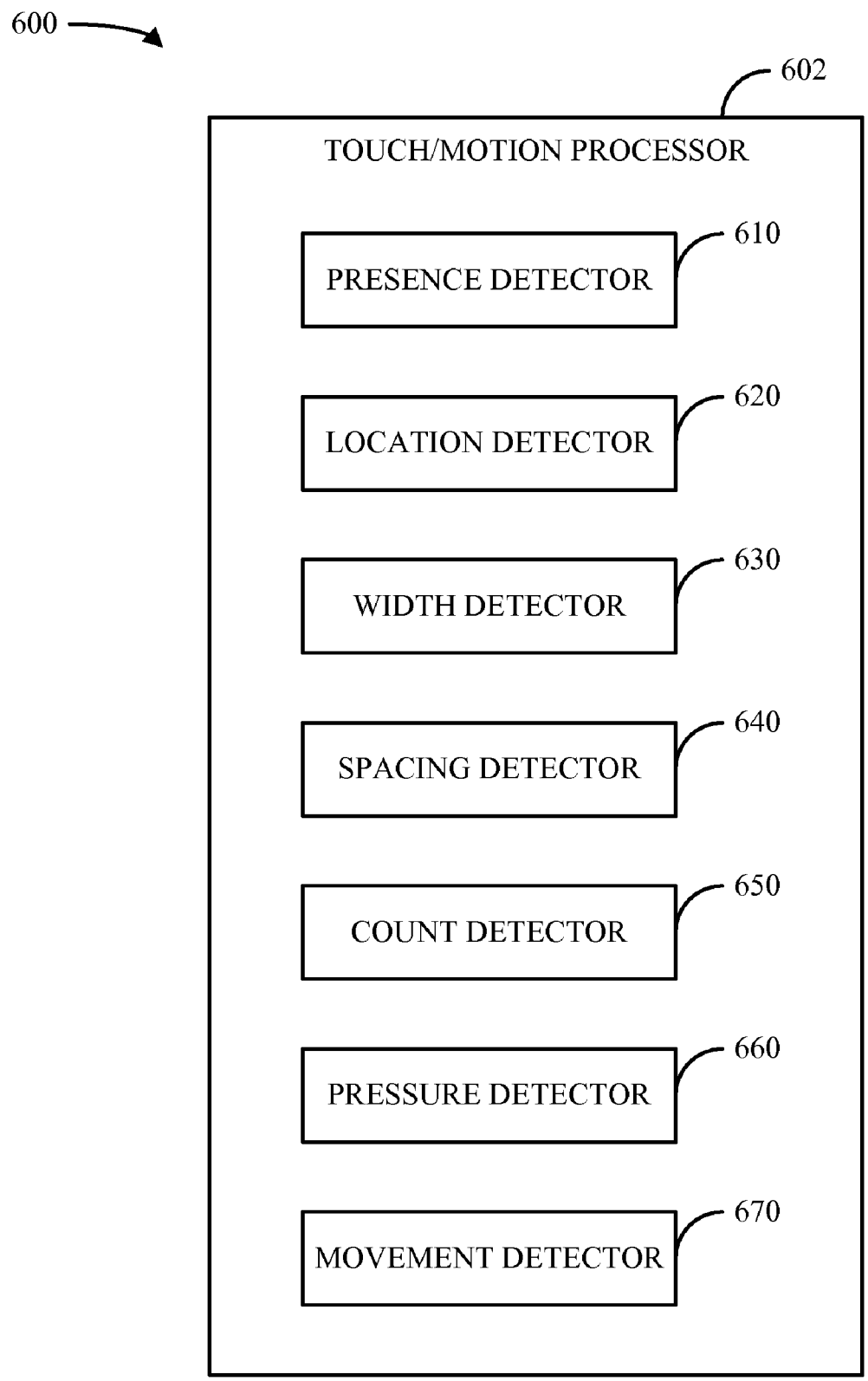
FIG. 6 is a block diagram of a system for processing sensor contacts in accordance with various aspects.

Referring now to FIG. 6, a block diagram of a system 600 for processing sensor contacts in accordance with various aspects is illustrated. In one example, system 600 can include a touch/motion processor 602 associated with a sensor applied to an electronic device. In accordance with one aspect, touch/motion processor 602 can include one or more detectors 610-670 for respectively detecting presence, location, width, spacing, count, pressure, and/or movement of touch points between an associated device edge and a user's hand. It can be appreciated that detectors 610-670 are provided by way of example and that, in various implementations, a touch/motion processor can implement fewer than the detectors 610-670 illustrated in FIG. 6 and/or one or more detectors not illustrated in FIG. 6.

In accordance with various aspects, detectors 610-670 can operate as follows. In accordance with one aspect, presence detector 610 can detect the presence or absence of contacts between a user's hand and/or fingers and an associated edge sensor, as illustrated by diagram 702 in FIG. 7. In one example, if a given sensing point on an associated sensor exhibits a change in capacitance (or another suitable property), presence detector 610 can determine that there is contact on some point along the perimeter of the device corresponding to the sensor. In another example, contact detected by presence detector, or lack thereof, can be utilized by touch/motion processor 602 that the device is either in or out of a user's hand.

Figure 7:
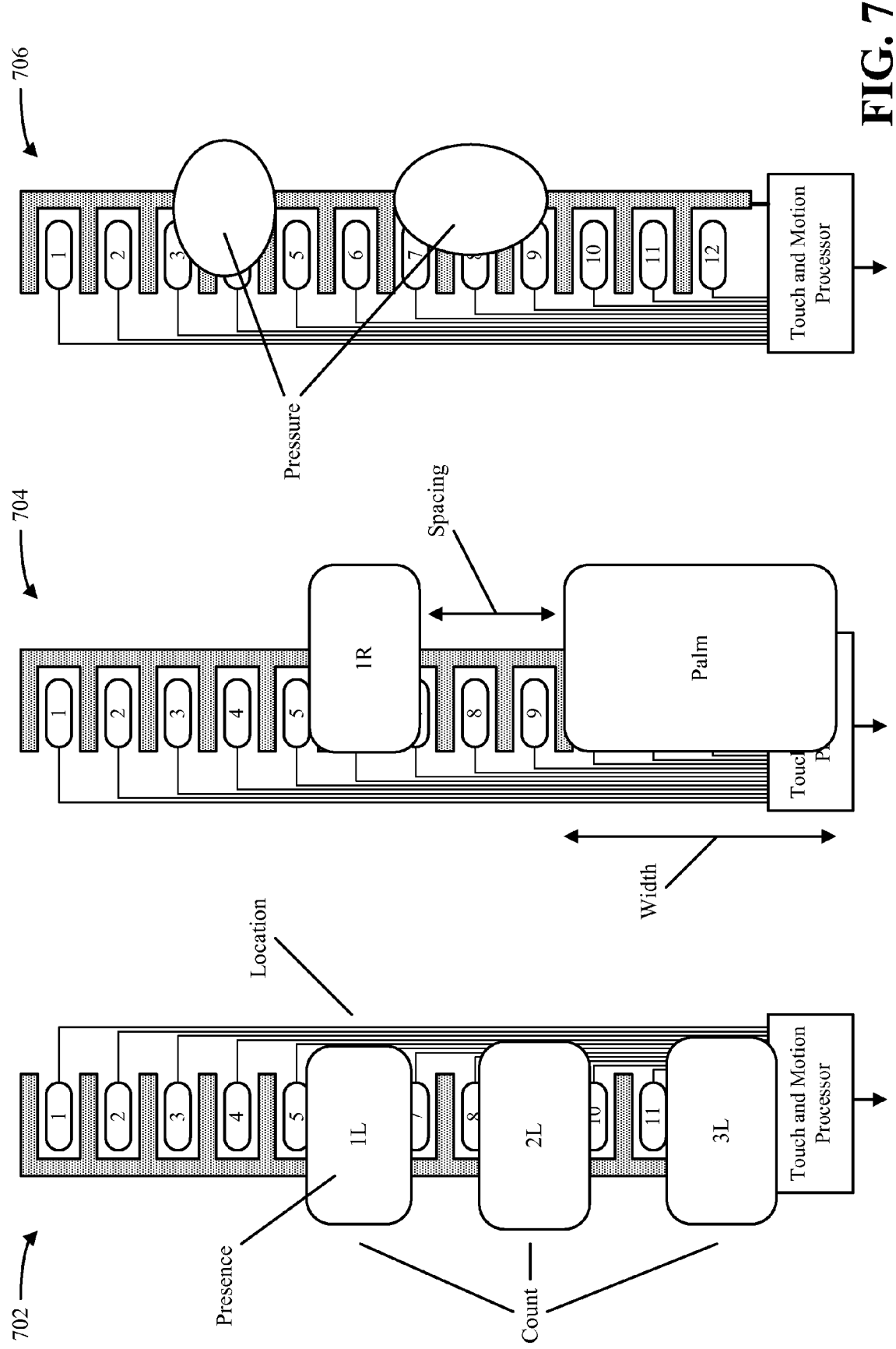
FIG. 7 illustrates example measurements relating to sensor contacts that can be performed in accordance with various aspects.

In accordance with another aspect, location detector 620 can be utilized to determine the location of one or more contacts on an associated sensor as illustrated by diagram 702 in FIG. 7. In one example, respective sensing points on an associated sensor can be numbered and have respective known locations along the sensing point array. Accordingly, when a specific sensing point exhibits a change in capacitance and/or another suitable property, location detector 620 can be utilized to determine the location of contact.

Width detector 630 can be utilized to determine the width of a contact with an associated edge sensor as illustrated by diagram 704 in FIG. 7. In one example, a substantially large number of sensing points can be provided on a sensor and spaced closely together such that a finger or palm spans multiple sensing points. Accordingly, width detector 630 can attempt to identify consecutive strings of contacted sensing points, based on which contact width can be determined. In accordance with one aspect, contact width as determined by width detector 630 can be utilized to determine whether contact was made by, for example, a finger, a palm, or a thumb of the user. In one example, width detector 630 can define the center of a contact as the middle point between the distant ends of the contacted sensing point string.

In accordance with another aspect, spacing detector 640 can be utilized to determine the spacing between multiple detected contacts, as illustrated by diagram 704 in FIG. 7. In one example, spacing detector 640 can determine spacing between contacts by identifying non-contacted sensing points that span gaps between contacted sensing points. Accordingly, it can be appreciated that small strings of non-contacted sensing points can indicate close spacing, while long strings of non-contacted sensing points can indicate distant spacing. This information can be used by touch/motion processor 602 to, for example, ascertain the relationship between contact points to determine the presence of a thumb and palm versus adjacent fingers.

In accordance with a further aspect, count detector 650 can be utilized to detect the number of distinct contacts made with an associated sensor, as illustrated by diagram 702 in FIG. 7. In one example, count detector 650 can regard respective consecutive strings of adjacent contacted sensing points as indicating an object (e.g., finger, thumb, palm, etc.) touching the associated device edge. Accordingly, count detector 650 can utilize this information to ascertain the number of objects touching one or more edges of the device.

Pressure detector 660 can be utilized to detect respective pressures of contacts to an associated sensor. In accordance with one aspect, pressure detector 660 can utilize variance in one or more properties of fingers and/or other objects contacting the sensor with pressure as illustrated by diagram 706 in FIG. 7. For example, it can be observed that fingers, palms, and the like tend to spread (e.g., creating more linear contact) as additional pressure is applied. Thus, in the example illustrated by diagram 706 in FIG. 7, a relatively light amount of pressure has been applied to the top-most contact point while heavier pressure has been applied to the lower contact point. As a result, it can be appreciated that an object influences more sensing points when pressed firmly versus lightly. Accordingly, pressure detector 660 can utilize this information to determine changes in applied pressure at one or more contact points. In one example, pressure detector 660 can measure relative changes in pressure and/or absolute pressure values at one or more contact points. In another example, the operation of pressure detector 660 can be normalized on a per-user basis in order to allow pressure detector 660 to adapt to the size, shape, and/or other properties of the hands and/or fingers of a particular user.

In accordance with another aspect, movement detector 670 can be utilized to detect movement of one or more contacts along an associated sensor. In one example, consecutive strings of contacted sensing points corresponding to a contact point can shift up and down if the object (e.g., finger, thumb, palm, etc.) making the contact is moved along the length of the sensor. Accordingly, movement detector 670 can use this information to ascertain movement of any object touching the device edge.

In one example, touch/motion processor 602 can report measurements from detectors 610-670 on a periodic basis. These reports can subsequently be utilized by, for example, various applications that are dependent on control inputs from the edge of an associated device in order to facilitate control of such applications.

Figure 8:
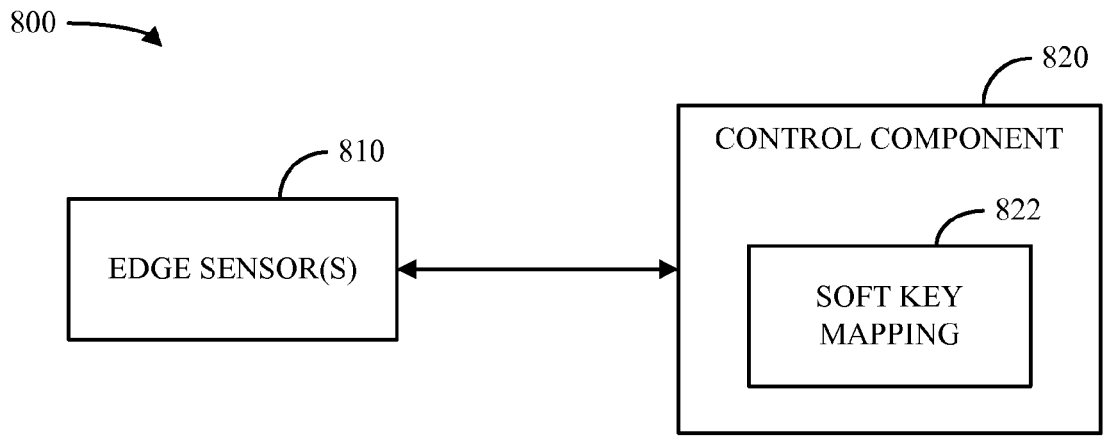
FIG. 8 is a block diagram for associating a soft key mapping with a sensor in accordance with various aspects.

Turning to FIG. 8, a system 800 for associating a soft key mapping 822 with one or more edge sensors 810 in accordance with various aspects is illustrated. As system 800 illustrates, one or more edge sensors 810 can be utilized in combination with a control component 820 to enable a user to provide input to an associated electronic device. In one example, control component 820 can employ a soft key mapping 822 that can map various portions of the edge sensor(s) 810 to respective control regions, thereby allowing contacts and/or movement relative to mapped portions of the edge sensor(s) 810 to be interpreted as user inputs. For example, soft key mapping 822 can include one or more "button" assignments that facilitate processing a contact with a given portion of edge sensor(s) 810 as equivalent to pressing a hardware button. As another example, soft key mapping 822 can include one or more "slider" assignments that facilitate processing movement of a contact point with a given portion of edge sensor(s) as equivalent to movement of a physical slider, dial, or the like.

In accordance with one aspect, a soft key mapping 822 can be made adaptive to the manner in which a particular user holds an associated device. For example, control regions provided by soft key mapping 822 can be moved between sensors 810 and/or along a sensor 810 based on the detected positions of a user's fingers. In another example, a soft key mapping 822 can be utilized to enable an associated device to be accommodating to a user with a physical disability such as missing fingers. For example, by determining the positioning of a user's palm and/or fingers along the edges of a device based on the width, spacing, or other properties of the user's contact points with the device, information regarding the physical ability of the user can be inferred. Based on this information, the soft key mapping 822 can be adjusted to best accommodate the user's ability and to allow a user that is physically unable to utilize traditional mechanical controls such as keypads, dials, or the like to provide input to an associated device. For example, if it is determined that a user has difficulty reaching one or more portions of a device while holding the device in his hand, the soft key mapping 822 can be adjusted to avoid placing control regions at those portions.

Figure 9:
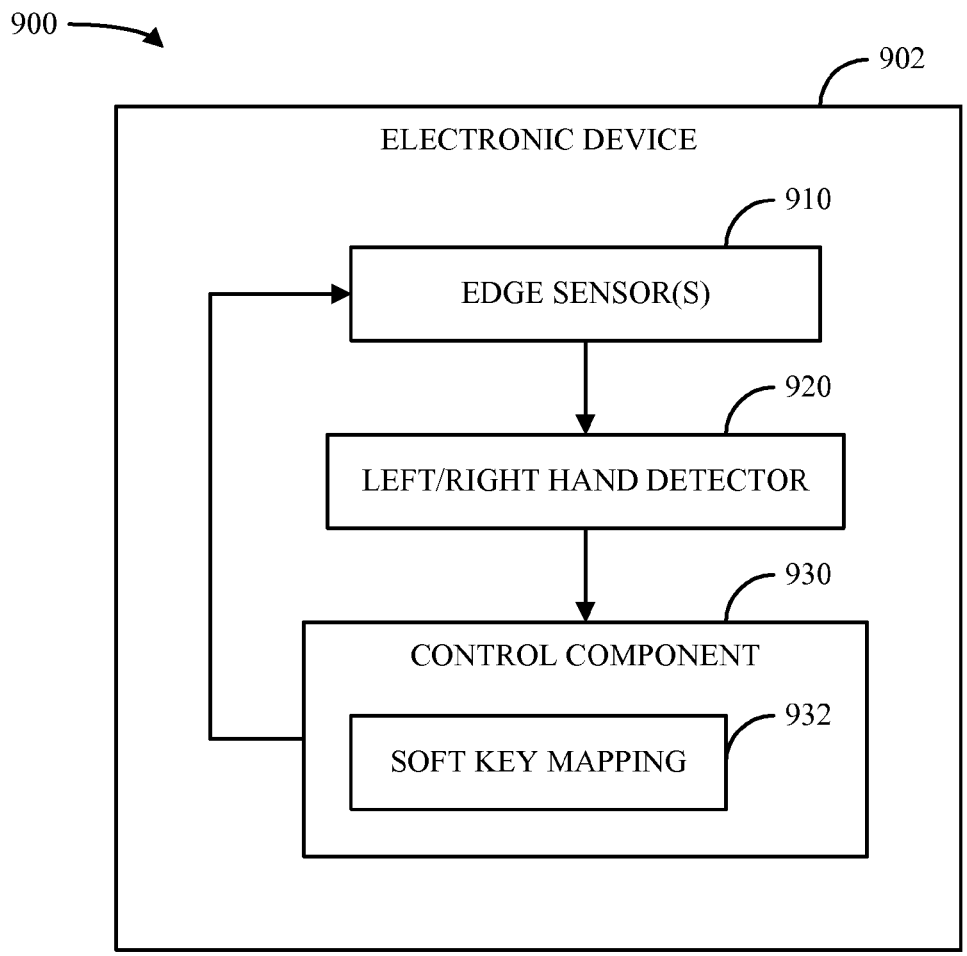
FIG. 9 is a block diagram of a system that facilitates soft key adaptation for a handheld electronic device in accordance with various aspects.

Referring to FIG. 9, illustrated is a system 900 that facilitates soft key adaptation for a handheld electronic device 902 in accordance with various aspects. As FIG. 9 illustrates, electronic device 902 can include one or more edge sensors 910 that can determine the presence and/or movement of a user's hands or fingers with respect to the electronic device 902 as described in accordance with various aspects above. In accordance with one aspect, outputs from edge sensor(s) 910 can be provided to a left/right hand detector 920, which can be utilized to determine whether the device 902 is being held in one, both, or neither of a user's left hand or right hand. The determination by the left/right hand detector 920 can then be utilized by a control component 930 to automatically adjust a soft key mapping 932 for the edge sensor(s) 910 associated with the device 902. In one example, the left/right hand detector 920 and/or control component 930 can operate in real time to monitor the state of the device 902 and to make adjustments to the soft key mapping 932 based on identified changes in the manner in which the device 902 is held.

In accordance with one aspect, by automatically adapting controls placed along the edges of a device 902, the left/right hand detector 920 can be utilized to provide improved input flexibility as compared to existing control techniques for handheld electronic devices. For example, conventional handheld device controls are generally primarily composed of fixed, mechanical elements such as buttons, sliders, dials, or the like, and as such are optimized on a device for either left-handed operation or right-handed operation but not both. While some devices provide limited adaptability for left-handed or right-handed operation, these devices traditionally require manual intervention to change from a left-handed orientation to a right-handed orientation. In contrast, the left/right hand detector 920 can analyze contact with edge sensor(s) 910 to adapt device inputs to left-handed or right-handed operation automatically without requiring manual intervention from a user. As the input mechanisms provided at device 902 can be implemented in an automatic and autonomous fashion, it can be appreciated that system 900 can enable more user friendly input than that which is provided by existing alternatives. Further, it can be appreciated that in the example of a handheld device used by a driver, the increased user friendliness provided by system 900 can enable the driver to focus more of his attention on driving, thereby additionally resulting in safety improvements.

In accordance with another aspect, by monitoring whether a device 902 is held in a user's left hand or right hand, the left/right hand detector 920 can enable the use of a soft key mapping 932 specifically tailored to a hand of the user that is presently holding the device 902. In contrast, existing electronic devices that utilize soft keys are traditionally unable to determine which hand a device is in. As a result, such devices are forced to assume that the user's thumb is present at both sides of the device in order to avoid presenting the user with unusable or unnatural soft keys. This, in turn, limits the number of device edge soft keys that can be utilized to two (e.g., top left and top right), which can render a device unusable for input-hungry applications for which more than two edge soft keys are required. Accordingly, in one example, the left/right hand detector 920 can be utilized to determine whether a device is in a user's left hand or right hand, thereby enabling multiple soft keys to be mapped to a single edge of the device if it is determined that a user's fingers are present at an edge of the device. For example, it can be appreciated that by utilizing a left/right hand detector 920 as illustrated by system 900, up to five edge sensor soft keys (e.g., one thumb soft key and four finger soft keys) can be applied to a device as compared to only two for a non-adaptive device.

Figure 10:
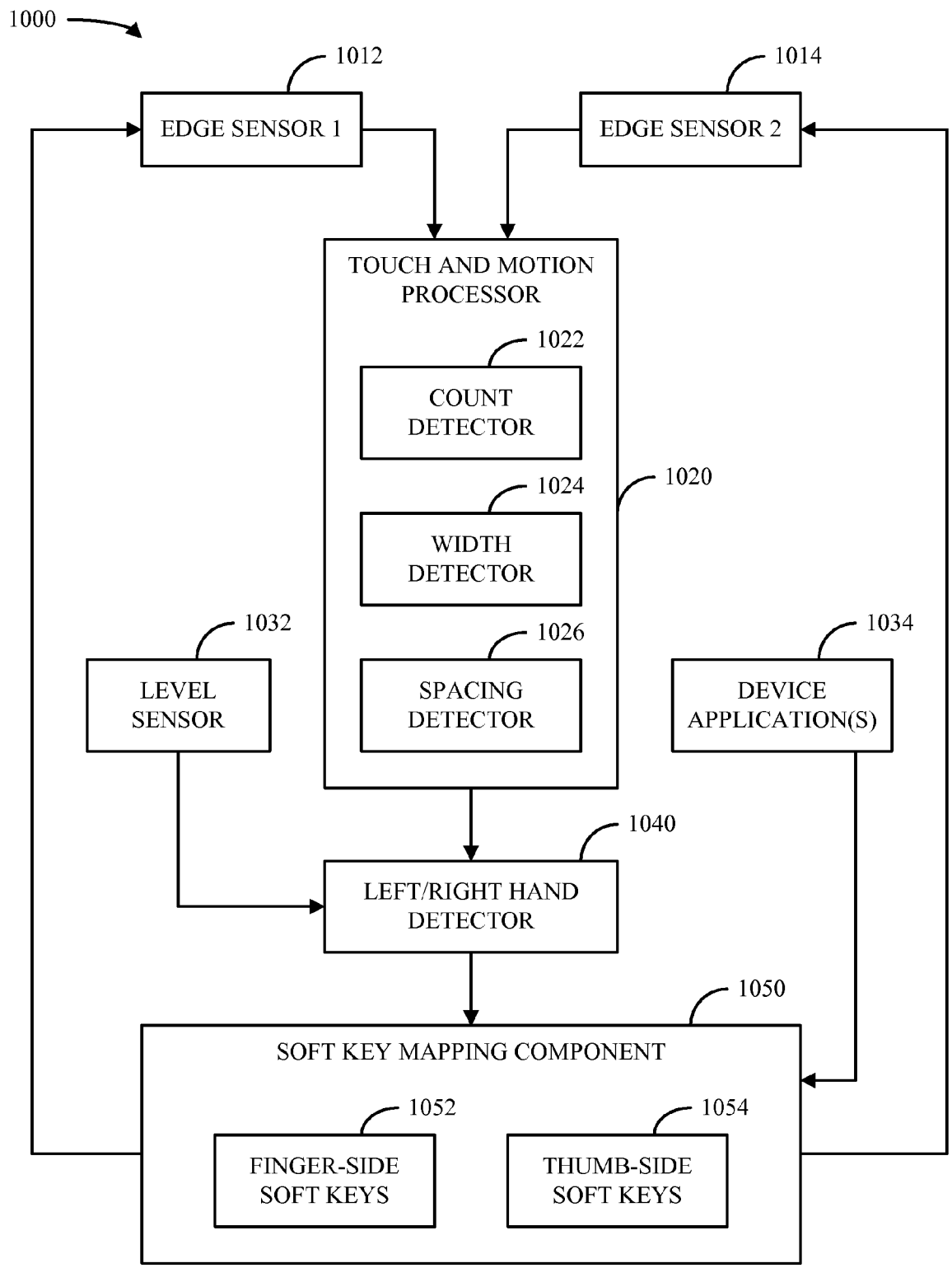
FIG. 10 is a block diagram of a system for adjusting soft keys associated with an electronic device for left-handed and/or right-handed operation in accordance with various aspects.

Referring now to FIG. 10, a system 1000 for adjusting soft keys 1052-1054 associated with an electronic device for left-handed and/or right-handed operation in accordance with various aspects is illustrated. In accordance with one aspect, system 1000 can include a set of edge sensors 1012-1014, which can be associated with respective edges of a mobile device to detect and monitor contact points between the mobile device and a user. In the example illustrated by FIG. 10, two edge sensors 1012 and 1014 can be utilized that correspond to, for example, opposite edges of an electronic device. However, it should be appreciated that any suitable number of edge sensors 1012-1014 can be used, which can correspond with any suitable edge(s) of an associated device.

In accordance with one aspect, edge sensors 1012-1014 can be associated with a touch and motion processor 1020, which can operate as generally described herein to determine one or more properties relating to contact between the edge sensor 1012-1014 and the hands and/or fingers of a user. Based on the properties determined by the touch and motion processor 1020, a left/right hand detector 1040 can be utilized to determine whether an associated device is located in one, both, or neither of user's left hand or a user's right hand. In one example, the touch and motion processor 1020 can include a count detector 1022 for determining a number of contacts with edge sensors 1012-1014, a width detector 1024 for determining the width of respective detected contacts, a spacing detector 1026 for determining spacing between respective contacts, and/or any other suitable contact monitoring and/or measurement mechanisms.

In accordance with another aspect, the left/right hand detector 1040 can utilize one or edge sensor contact properties as provided by the touch and motion processor 1020 to determine which side of an associated device touches a user's fingers (or the "finger side" of the device) and which side of the device touches a user's thumb and palm (or the "thumb side" of the device). In one example, the left/right hand detector 1040 can utilize the touch and motion processor 1020 to make this determination based on various parameters relating to the edge sensors 1012-1014 and their respective outputs. For example, the number of contact points detected on respective sides of a device (e.g., by count detector 1022) can be compared to one another. Based on this comparison, a side of the device having more detected contact points can be regarded as more likely to be the finger side of the device than a side of the device having less contact points. For example, it can be observed that the finger side of a normally-held device can exhibit up to four points of contact, while the thumb side may exhibit no more than two.

In another example, the width of respective contacts can be determined (e.g., by a width detector 1024) and compared to one another. Based on this comparison, a contact having the largest width can be regarded as more likely to be a user's palm, and the side at which this contact is located can be regarded as more likely to be the thumb side of the device.

In a third example, spacing between respective contacts on respective sides of the device can be determined (e.g., by a spacing detector 1026) and compared, based on which a side of the device having the largest determined spacing can be regarded as more likely to be the thumb side of the device. It can be appreciated that this determination can be made based on the fact that, held normally, a user's hands will exhibit greater spacing between the thumb and palm on the thumb side of the device than between fingers on the finger side of the device.

In accordance with one aspect, once the left/right hand detector 1040 identifies the finger side and the thumb side of the device, a soft key mapping component 1050 can be utilized to apply different soft key maps 1052 and 1054 to respective edge sensors 1012 and 1014 at the finger and thumb sides of the device. In one example, the soft key mapping component 1050 can apply one or more sliding controls (e.g., volume and/or scrolling controls) to the thumb side of the device, while one or more tapping controls (e.g., selection controls) can be applied to the finger side of the device.

Figure 11:
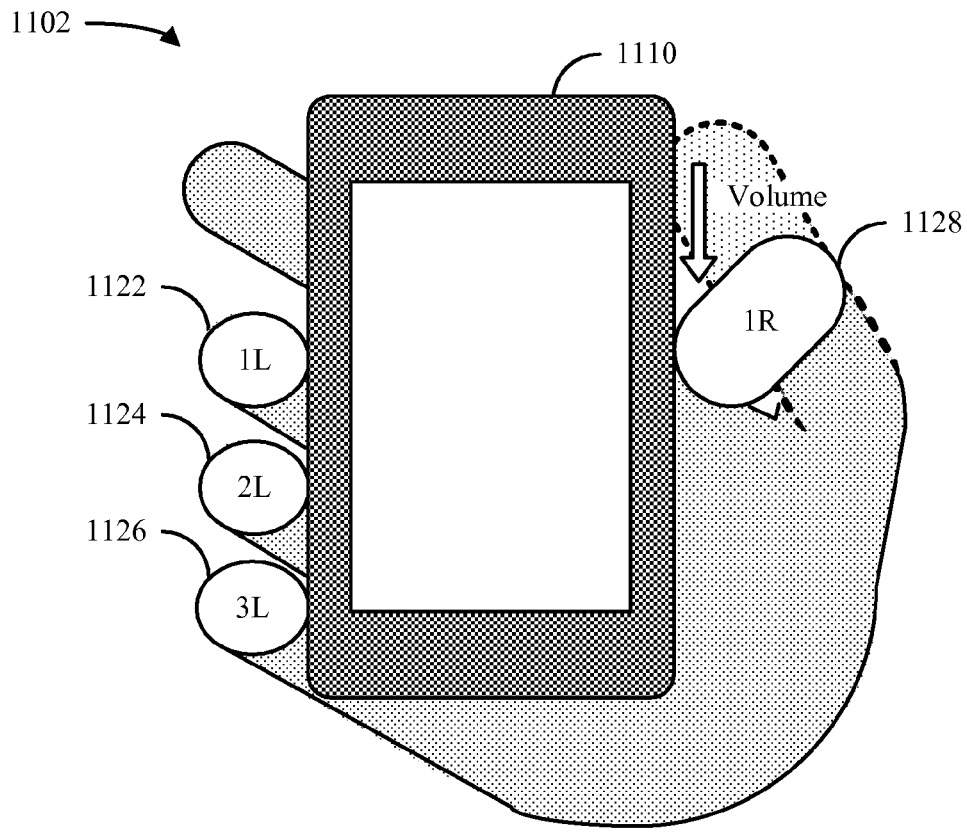
FIGS. 11-12 illustrate example soft key configurations for an electronic device in accordance with various aspects.
Figure 11:
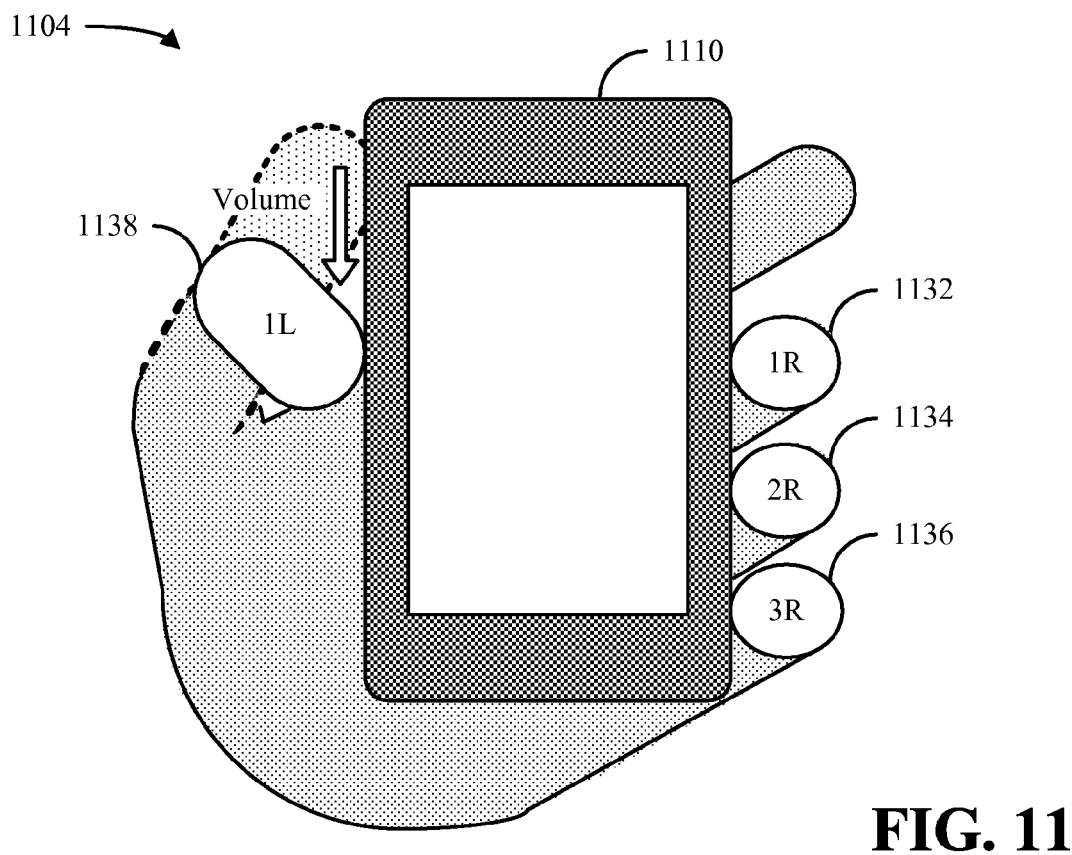

For example, a sliding control can be implemented at the thumb side of a device to facilitate controlling audio volume for a device 1110 as illustrated by diagrams 1102 and 1104 in FIG. 11. In accordance with one aspect, the volume controller illustrated by diagrams 1102 and 1104 can be utilized in connection with a voice call, a media player application, and/or any other suitable application at the device 1110. As diagram 1102 illustrates, an electronic device 1110 can determine that the device 1110 is in a user's right hand based on, for example, the positions of a user's fingers 1122-1126 and thumb 1128. Based on this determination, a sliding volume control can be mapped to the upper portion of the right edge of the device 1110 to enable a user to control the volume of the device 1110 by sliding his thumb along the edge of the device 1110. Similarly, as diagram 1104 illustrates, if a device 1110 instead determines based on, for example, a user's fingers 1132-1136 and thumb 1138 that the device 1110 is in a user's left hand, the volume control can instead be mapped to the upper portion of the left edge of the device 1110. In accordance with one aspect, a device 1110 can additionally alter between a right-handed mapping as illustrated by diagram 1102 and a left-handed mapping as illustrated by diagram 1104 upon detecting changes in the hand being used to hold the device 1110.

Figure 12:
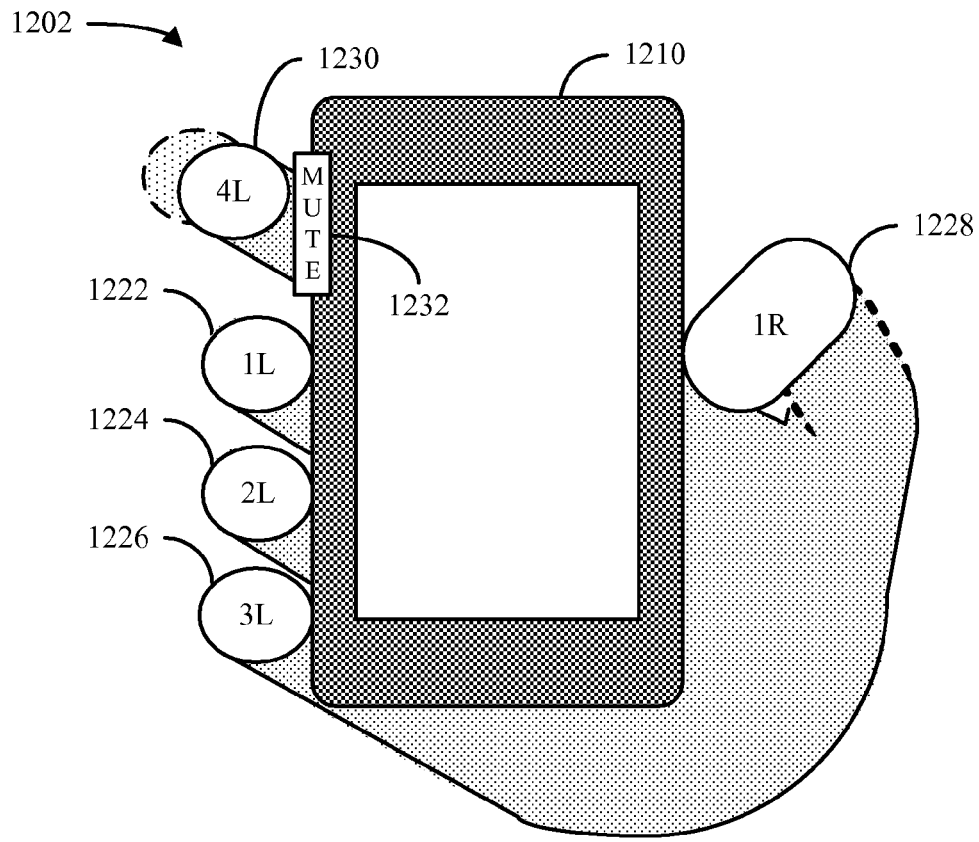
Figure 12:
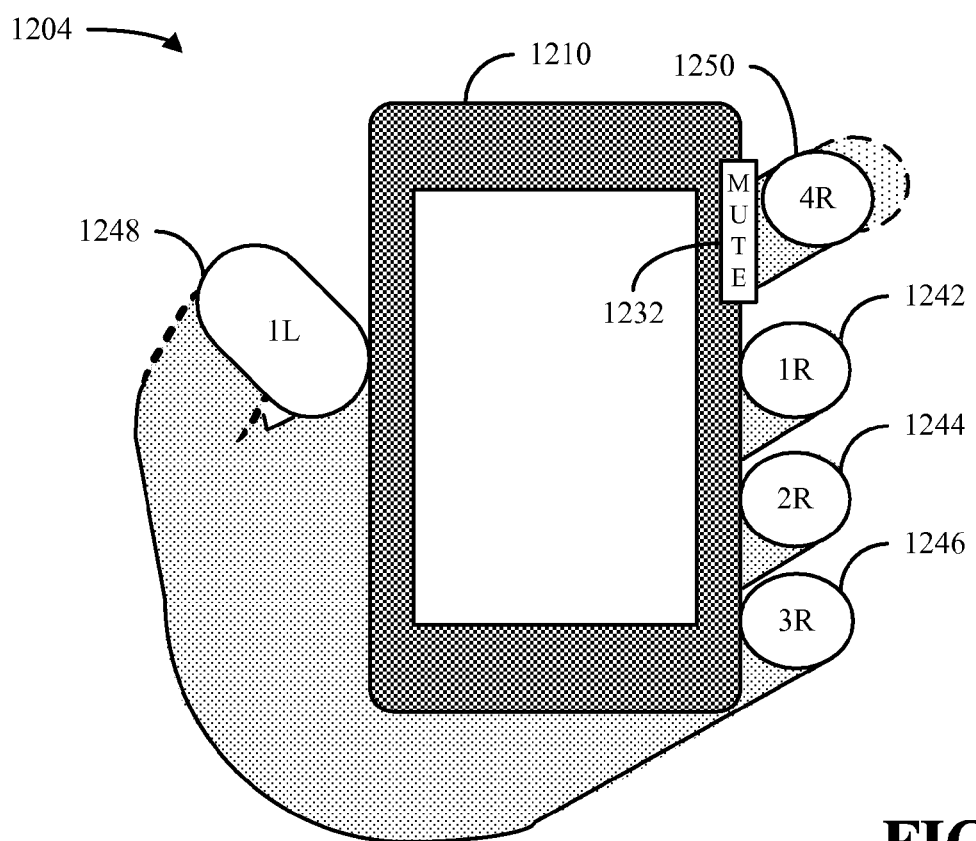

As another specific example, a tapping control can be mapped to one or more portions of the finger side of a device 1210 to facilitate muting the device as illustrated by diagrams 1202 and 1204 in FIG. 12. In a similar manner to FIG. 11, the control implementations illustrated by diagrams 1202 and 1204 can be utilized in connection with a voice call, a media player application, and/or any other suitable application associated with the device 1210. As diagram 1202 illustrates, it can be determined that a user's right hand is holding a device 1210 based on the positions of his fingers 1222-1226 and thumb 1228 and/or other suitable factors. Accordingly, a tapping mute control 1232 can be implemented at the upper portion of the finger side of the device 1210 such that the user's right pointer finger 1230 can tap the mapped portion of the device edge to mute the device 1210. In accordance with one aspect, a mute control 1232 and/or another tapping control can be positioned such that a user's hand is forced to enter an unnatural holding position to engage the control. By doing so, it can be appreciated that the probability of accidentally engaging such a control can be reduced. Thus, for example, as illustrated by diagram 1202, a mute control 1232 can be placed such that a user must engage the control with his pointer finger 1230, thereby requiring a deliberate action from a user who is holding the device 1210 with his thumb 1228 and other fingers 1222-1226.

In a similar example illustrated by diagram 1204, if it is determined based on the positioning of a user's thumb 1248 and fingers 1242-1246 that the device 1210 is in a user's left hand, the mute control 1232 can instead be mapped to the upper portion of the right edge of the device 1210 such that it can be engaged by a user's right pointer finger 1250. Further, in a similar manner to that described above with respect to FIG. 11, a device 1210 can additionally alter between a right-handed mapping as illustrated by diagram 1202 and a left-handed mapping as illustrated by diagram 1204 upon detecting changes in the hand being used to hold the device 1210.

Figure 13:
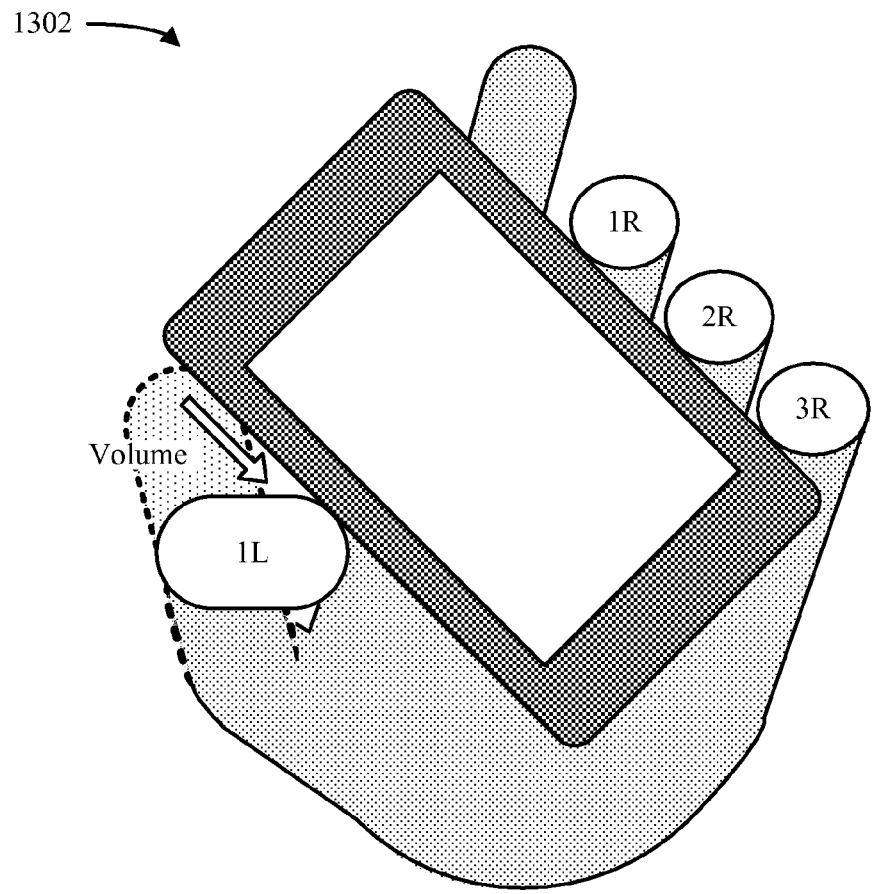
FIG. 13 illustrates an example technique for utilizing level sensing for soft key adjustment in accordance with various aspects.
Figure 13:
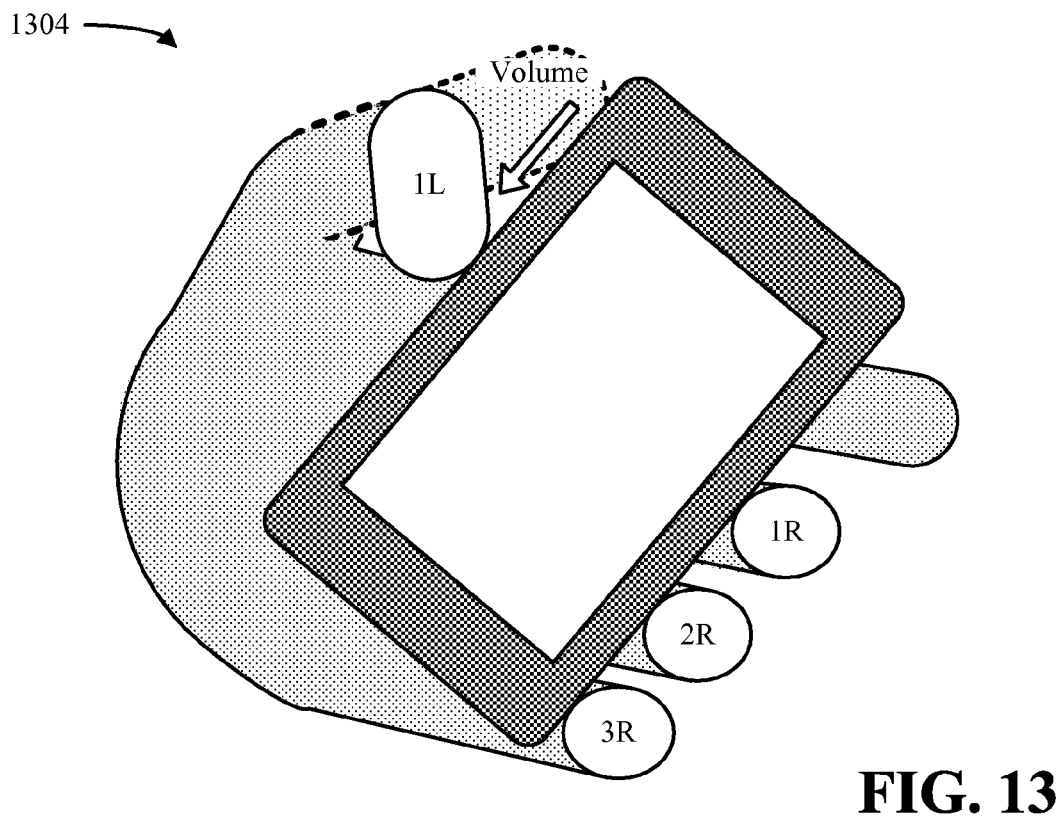

With reference again to FIG. 10, the left/right hand detector 1040 in system 1000 can additionally utilize a level sensor 1032 to determine information relating to the orientation of an associated device, which can be utilized to aid in the determination of the left/right hand detector 1040 in various scenarios. For example, the level sensor 1032 can be utilized while an associated device is engaged in a voice call, as illustrated by diagrams 1302-1304 in FIG. 13. In the event that a user is placing a non-hands-free voice call using an associated electronic device, it can be appreciated that the hand positioning illustrated by diagram 1302, wherein a user's thumb is at the bottom edge of the device and the user's fingers are located at the top edge of the device, is a natural hand position whereas the opposite hand positioning, as illustrated by diagram 1304, is not. Accordingly, based on information obtained from the level sensor 1032 during a voice call at an associated device, the left/right hand detector 1040 can regard the higher side of the device as more likely to be the finger side of the device and the lower side of the device as more likely to be the thumb side of the device.

In a similar example to the above, the level sensor 1032 and left/right hand detector 1040 can alternatively be utilized to infer one or more applications that are executing at an associated device. For example, if the level sensor 1032 determines that a device is being held on its side but the touch and motion processor 1020 determines that there are more contact points on the bottom side of the device than the top side (e.g., in a similar manner to diagram 1304 in FIG. 13), then the left/right hand detector 1040 can determine both that the bottom side of the device is more likely to be the finger side of the device and that the device is not likely being utilized for an application such as a voice call where such a hand positioning would be unnatural. Accordingly, the soft key mapping component 1050 can provide soft key mappings 1052-1054 that reflect these inferences.

In accordance with another aspect, information relating to one or more applications 1034 executing at an associated device can be utilized by the soft key mapping component 1050 to perform soft key mapping on a per-application and/or per-application-type basis. It can be appreciated that the soft key mapping component 1050 can additionally and/or alternatively provide soft key mappings 1052-1054 for an associated device based on other factors, such as user preferences, manual definitions, or the like.

Figure 14:
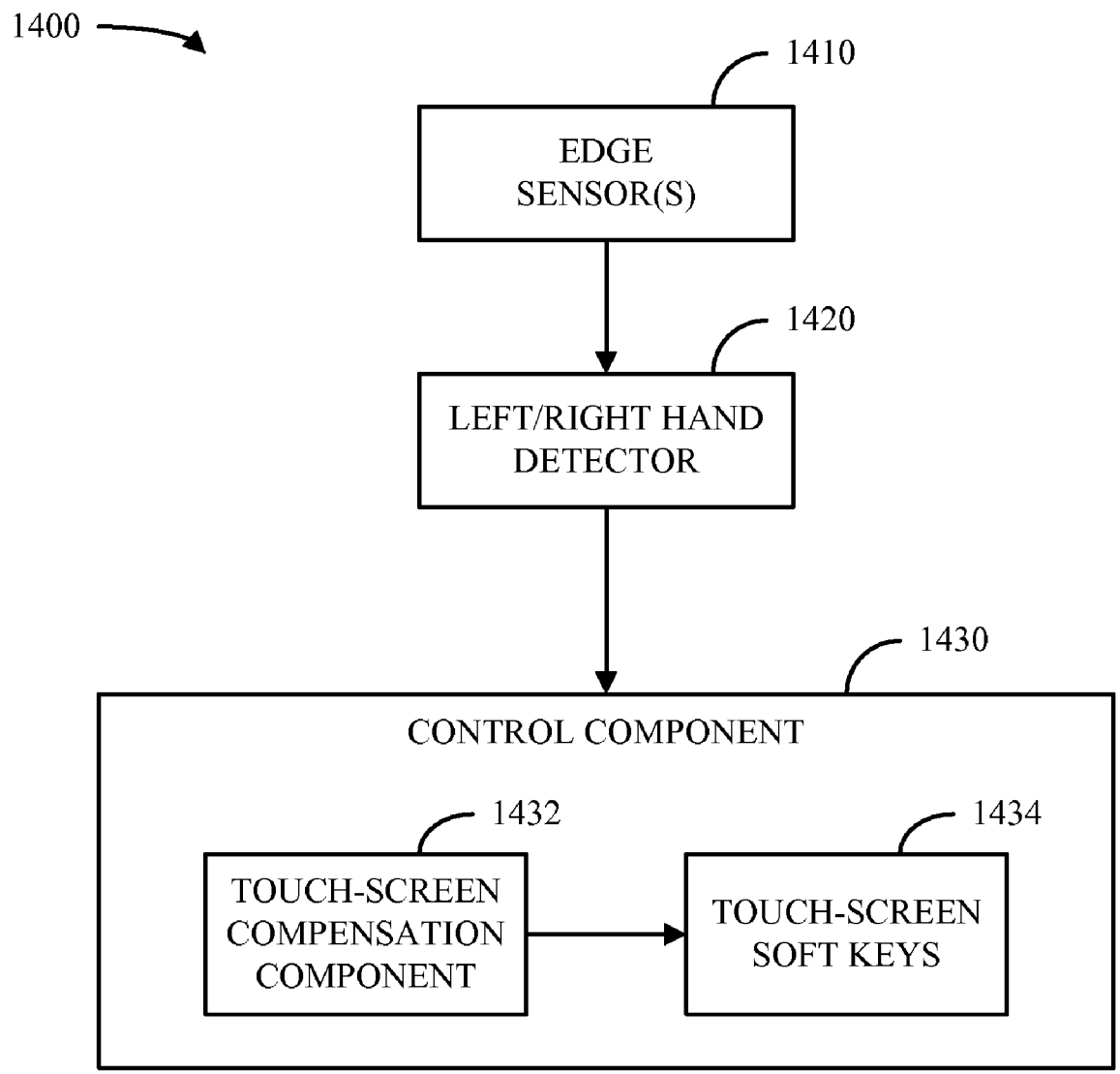
FIG. 14 is a block diagram of a system for touch-screen contact location compensation in accordance with various aspects.

Turning now to FIG. 14, a system 1400 for touch-screen contact location compensation in accordance with various aspects is illustrated. As FIG. 14 illustrates, system 1400 can include one or more edge sensors 1410, which can detect and/or monitor contact between a user and one or more edges of an associated device as generally described herein. As FIG. 14 further illustrates, a left/right hand detector 1420 can utilize information obtained from the edge sensor(s) 1410 to determine whether the device is in a user's left hand and/or right hand as described above with respect to FIGS. 9-10. In accordance with one aspect, based on the determination of the left/right hand detector 1420, a control component 1430 associated with the device can compensate one or more points of contact with a touch-screen associated with the device. For example, the control component can utilize a touch-screen compensation component 1432, which can be utilized to adjust contacts with the touch screen with respect to one or more soft keys 1434 mapped to various portions of the touch-screen.

By way of example, system 1400 can be utilized in connection with a touch typing application at a handheld device to facilitate improved accuracy for a user that is typing on a touch-screen with the thumb of a hand being utilized to hold the device. For example, it can be appreciated that if the thumb of a hand holding an electronic device is utilized to manipulate a touch-screen at the front of the device, the natural angle of contact between the thumb and touch-screen is less than 90 degrees due to the mechanics of the human hand. Due to this non-perpendicular angle of contact, it can be further appreciated that actual points of contact made between the thumb and touch-screen can be disparate from corresponding intended points of contact in various instances. For example, actual points of contact can be to the left of intended points of contact for a left-handed user or to the right of intended points of contact for a right-handed user. Thus, if a user utilizes a touch keyboard associated with a touch-screen to type information with the thumb of the hand being used to hold the associated device, it can be appreciated that the soft keys of the touch keyboard that are actually contacted may be different from the intended soft keys. Traditionally, in order to avoid this inaccuracy, a user attempting to enter input on a touch-screen in such a manner would be required to rotate his thumb into an unnatural position to create a substantially perpendicular angle with the touch-screen prior to entering input.

In contrast, to mitigate the above and to provide improved accuracy and comfort in touch typing applications and/or other suitable applications, the control component 1430 can utilize information provided by the left/right hand detector 1420 relating to whether a device is known to be in a user's left hand and/or right hand and compensate for natural error in contacting the touch-screen based on this information. By doing so, it can be appreciated that the control component 1430 can enable a user to accurately enter input on a touch-screen from a more natural holding position, as a user is not required to rotate his thumb into an unnatural position prior to entering input.

Figure 15:
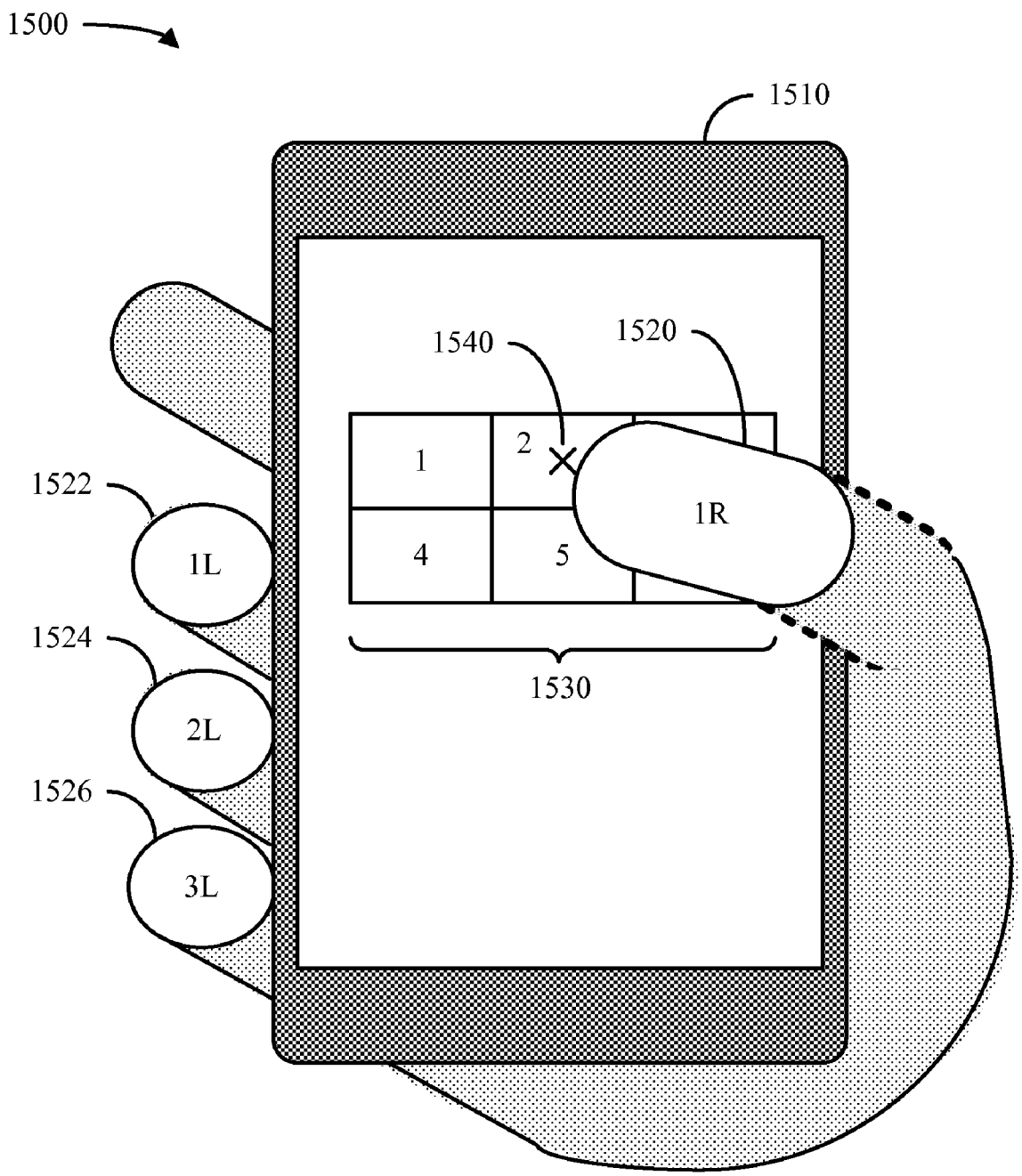
FIG. 15 illustrates an example technique for implementing touch-screen compensation at an electronic device in accordance with various aspects.

An example of a correction that can be performed by the control component 1430 and/or the touch-screen compensation component 1432 is illustrated by diagram 1500 in FIG. 15. As diagram 1500 illustrates, an electronic device 1510 can utilize the positioning of a user's fingers 1522-1526 and/or thumb 1520 to infer that the device 1510 is in a user's right hand. Based on this determination, the device 1510 can monitor for points of contact between the user's thumb 1520 and a set of touch-screen soft keys 1530. When contact is detected, the device 1510 can correct the point of contact based on the angle of the user's thumb with respect to the touch-screen to produce a corrected point of contact 1540. Additionally and/or alternatively, the device 1510 can leverage the fact that a user's right hand is holding the device 1510 to shift the display of various items displayed on the touch-screen associated with the device 1510 such that they are not obstructed by the user's right thumb 1520. For example, as diagram 1500 illustrates, labels for one or more soft keys 1530 displayed on the touch-screen can be shifted to one side. Additionally and/or alternatively, other text and/or graphics, such as confirmation text for one or more soft keys 1530 engaged by the user, can similarly be shifted such that they are not obstructed by a user's thumb 1520.

Referring again to FIG. 14, the left/right hand detector 1420 can, in accordance with one aspect, be utilized in combination with the control component 1430 to monitor contact with a touch-screen to determine whether to apply compensation for respective touch-screen contact points. For example, the left/right hand detector 1420 and/or control component 1430 can differentiate between touch-screen contacts made by the thumb of a hand being used to hold an associated device and contacts made by other objects, such as the fingers of a user's non-holding hand, a stylus, or the like, such that correction of contact points is only performed for contact between the touch-screen and the thumb of the user's holding hand. This determination can be performed by the left/right hand detector 1420 and/or control component 1430 in various manners. For example, edge sensor(s) 1410 can be utilized to determine whether a user's thumb is contacting the edge of the device, and it can be determined upon a positive determination that the thumb of the user's holding hand is not being used to contact the touch-screen. Additionally and/or alternatively, shapes of various contact points can be leveraged to determine an object that is contacting the touch-screen. For example, it can be observed that contact points with a touch-screen become more circular in shape as the angle of contact approaches 90 degrees. Accordingly, system 1400 can determine whether and to what extent to apply correction for a contact point by determining a deviation of the contact point from a circular shape.

In accordance with another aspect, system 1400 can additionally determine whether an associated device is being held in both of a user's hands and provide compensation for multiple disparate angles of touch-screen contact. For example, if the left/right hand detector 1420 determines based on information from the edge sensor(s) 1410 that a user is holding a device in both hands, the touch-screen compensation component 1432 can divide the touch-screen into zones corresponding to each hand. For example, the touch-screen can be divided substantially in half such that a left zone is associated with a user's left hand and a right zone is associated with a user's right hand. In one example, each zone of the touch-screen can be associated with a different correction factor, such that respective contacts made in a given zone of the touch-screen can be corrected to compensate for the angle of the thumb of the hand associated with the zone. It can be appreciated that zones can be divided in any suitable manner to account for a user's tendencies, the relative reaches of a user's thumbs, or the like. Further, it can be appreciated that zones can be apportioned for a device oriented vertically, as illustrated by diagram 1500, horizontally, and/or in any other suitable orientation. In one example, an accelerometer or the like can be utilized to determine the orientation of the device for zoning of the touch-screen.

Figure 16:
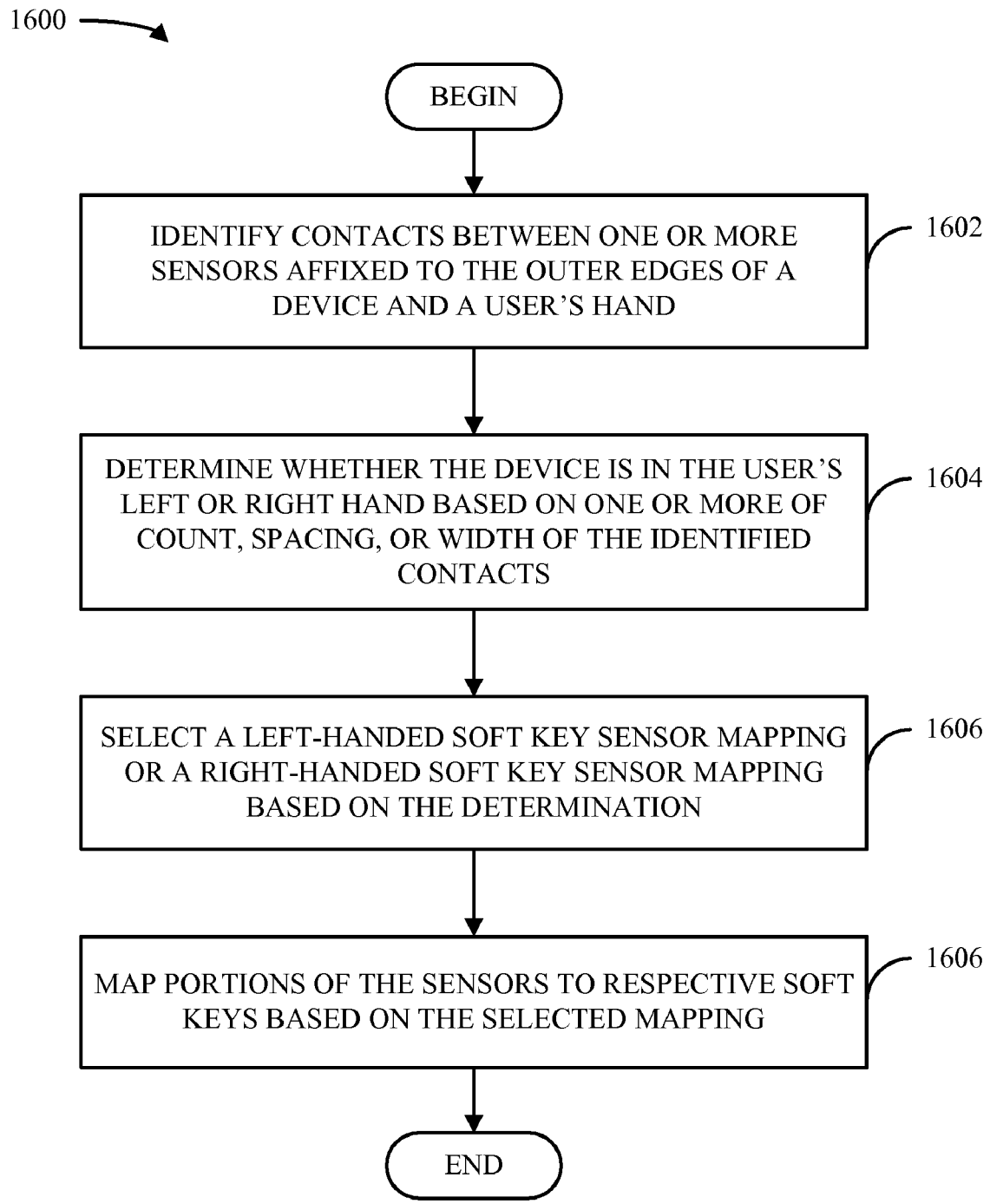
FIG. 16 is a flowchart of a method for adapting a handheld device for left-handed and/or right-handed operation.
Figure 17:
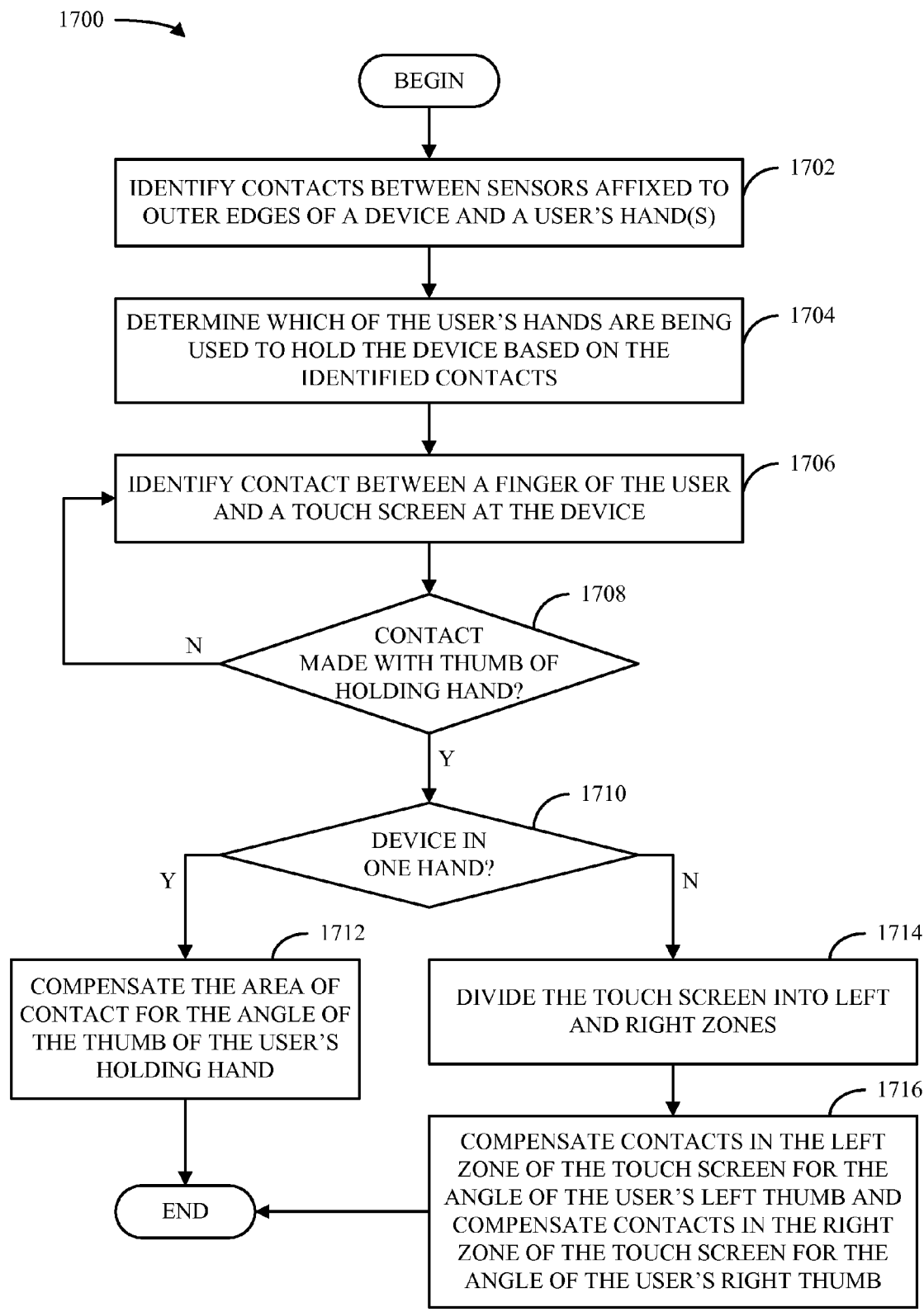
FIG. 17 is a flowchart of a method for adjusting points of contact with an electronic device based on a manner in which the electronic device is held.

Turning to FIGS. 16-17, methodologies that can be implemented in accordance with various aspects described herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 16, a method 1600 for adapting a handheld device (e.g., device 902) for left-handed and/or right-handed operation is illustrated. At 1602, contacts between one or more sensors (e.g., edge sensors 910) affixed to the outer edges of a device and a user's hand are identified. At 1604, it is determined (e.g., by a left/right hand detector 920) whether the device is in the user's left or right hand based on one or more of count, spacing, or width of the identified contacts. At 1606, a left-handed soft key sensor mapping or a right-handed soft key sensor mapping (e.g., soft key mapping 932) is selected (e.g., by a control component 930) based on the determination at 1604. At 1608, portions of the sensors are mapped to respective soft keys based on the mapping selected at 1606.

FIG. 17 illustrates a method 1700 for adjusting points of contact with an electronic device (e.g., a device 1510) based on a manner in which the electronic device is held. At 1702, contacts between sensors (e.g., edge sensors 1410) affixed to outer edges of a device and a user's hand(s) are identified. At 1704, it is determined (e.g., by a left/right hand detector 1420) which of the user's hands are being used to hold the device based on the contacts identified at 1702. At 1706, contact between a finger of the user and a touch screen at the device is identified.

At 1708, it is then determined whether the contact identified at 1706 was made with the thumb of a hand being used to hold the device (e.g., thumb 1520). If the determination at 1708 is negative, method 1700 returns to 1706 to identify a new contact. Otherwise, method 1700 proceeds to 1710, wherein it is determined whether the device is being held in one hand. If it is determined at 1710 that the device is being held in one of the user's hands, method 1700 can conclude at 1712, wherein the area of the contact identified at 1706 is compensated for the angle of the thumb of the user's holding hand (e.g., by a touch-screen compensation component 1432 associated with a control component 1430). Otherwise, if it is determined that the device is not being held in one hand (e.g., because the device is being held in two hands), method 1700 continues to 1714, wherein the touch screen is divided into left and right zones. Method 1700 can then conclude by proceeding from 1714 to 1716, wherein contacts in the left zone of the touch screen are compensated for the angle of the user's left thumb and contacts in the right zone of the touch screen are compensated for the angle of the user's right thumb.

Figure 18:
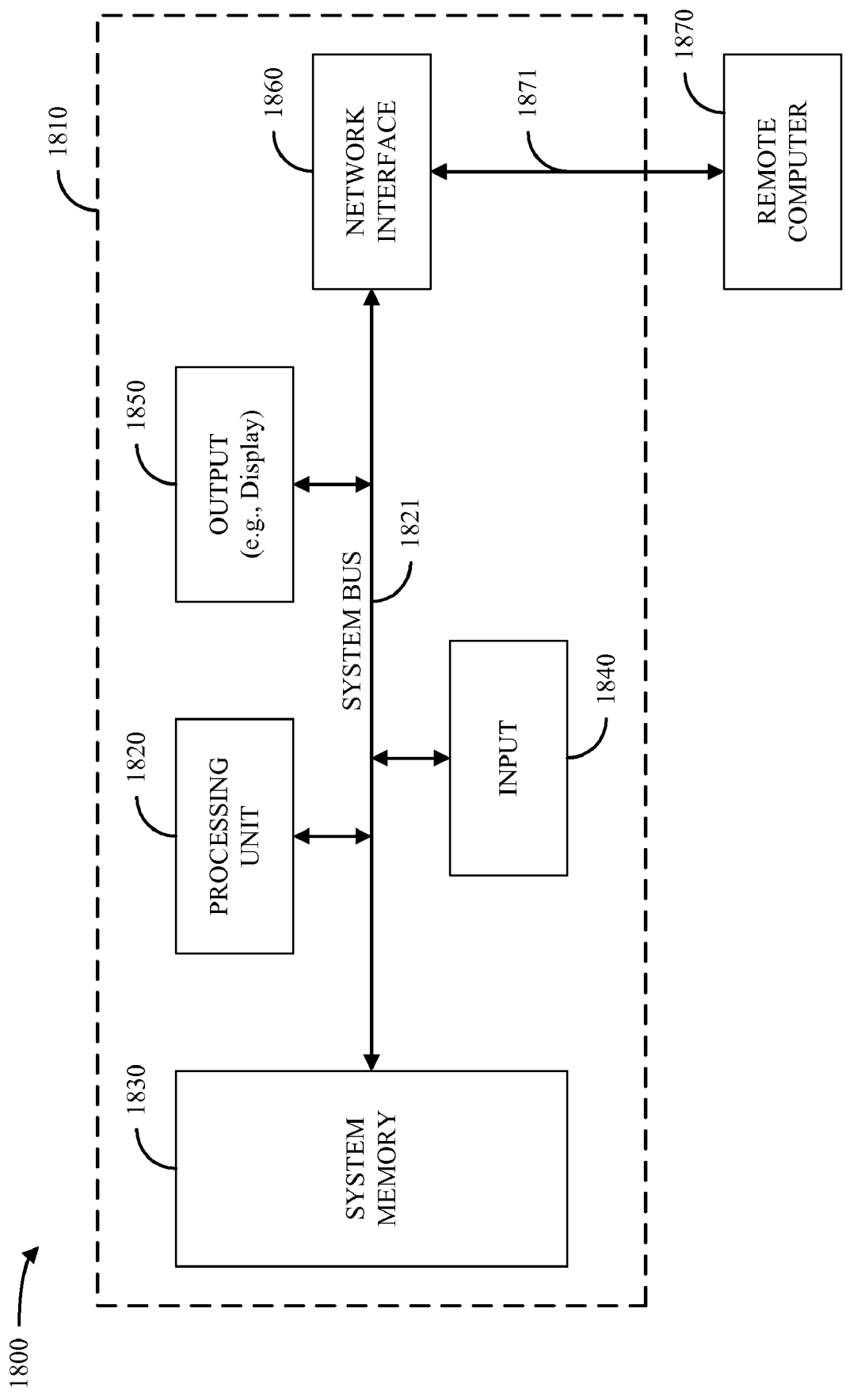
FIG. 18 is a block diagram of a computing system in which various aspects described herein can function.

Turning to FIG. 18, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 18 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 18 thus illustrates an example of a suitable computing system environment 1800 in which the claimed subject matter can be implemented, although as made clear above, the computing system environment 1800 is only one example of a suitable computing environment for a media device and is not intended to suggest any limitation as to the scope of use or functionality of the claimed subject matter. Further, the computing environment 1800 is not intended to suggest any dependency or requirement relating to the claimed subject matter and any one or combination of components illustrated in the example operating environment 1800.

With reference to FIG. 18, an example of a computing environment 1800 for implementing various aspects described herein includes a general purpose computing device in the form of a computer 1810. Components of computer 1810 can include, but are not limited to, a processing unit 1820, a system memory 1830, and a system bus 1821 that couples various system components including the system memory to the processing unit 1820. The system bus 1821 can be any of several types of bus structures including a memory bus or memory controller, a peripheral bus, and a local bus using any of a variety of bus architectures.

Computer 1810 can include a variety of computer readable media. Computer readable media can be any available media that can be accessed by computer 1810. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1810. Communication media can embody computer readable instructions, data structures, program modules or other data in a modulated data signal such as a carrier wave or other transport mechanism and can include any suitable information delivery media.

The system memory 1830 can include computer storage media in the form of volatile and/or nonvolatile memory such as read only memory (ROM) and/or random access memory (RAM). A basic input/output system (BIOS), containing the basic routines that help to transfer information between elements within computer 1810, such as during start-up, can be stored in memory 1830. Memory 1830 can also contain data and/or program modules that are immediately accessible to and/or presently being operated on by processing unit 1820. By way of non-limiting example, memory 1830 can also include an operating system, application programs, other program modules, and program data.

The computer 1810 can also include other removable/non-removable, volatile/nonvolatile computer storage media. For example, computer 1810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1821 through a non-removable memory interface such as an interface, and a magnetic disk drive or optical disk drive can be connected to the system bus 1821 by a removable memory interface, such as an interface.

A user can enter commands and information into the computer 1810 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1820 through user input 1840 and associated interface(s) that are coupled to the system bus 1821, but can be connected by other interface and bus structures, such as a parallel port, game port or a universal serial bus (USB). A graphics subsystem can also be connected to the system bus 1821. In addition, a monitor or other type of display device can be connected to the system bus 1821 via an interface, such as output interface 1850, which can in turn communicate with video memory. In addition to a monitor, computers can also include other peripheral output devices, such as speakers and/or a printer, which can also be connected through output interface 1850.

The computer 1810 can operate in a networked or distributed environment using logical connections to one or more other remote computers, such as remote computer 1870, which can in turn have media capabilities different from device 1810. The remote computer 1870 can be a personal computer, a server, a router, a network PC, a peer device or other common network node, and/or any other remote media consumption or transmission device, and can include any or all of the elements described above relative to the computer 1810. The logical connections depicted in FIG. 18 include a network 1871, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 1810 is connected to the LAN 1871 through a network interface or adapter. When used in a WAN networking environment, the computer 1810 can include a communications component, such as a modem, or other means for establishing communications over the WAN, such as the Internet. A communications component, such as a modem, which can be internal or external, can be connected to the system bus 1821 via the user input interface at input 1840 and/or other appropriate mechanism. In a networked environment, program modules depicted relative to the computer 1810, or portions thereof, can be stored in a remote memory storage device. It should be appreciated that the network connections shown and described are non-limiting examples and that other means of establishing a communications link between the computers can be used.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
   a sensor located at an exterior surface of an electronic device that receives presence information relating to presence of at least a portion of a hand of a user relative to the exterior surface;
   a memory that stores computer executable instructions and the presence information;
   a processor, communicatively coupled to the memory and sensor, that facilitates execution of the computer executable instructions to at least:
      determine, based on the presence information, which hand of two user hands is being used to hold the electronic device,
      determine whether a position of contact with a touch screen of the electronic device has been made by a thumb of the hand determined to be holding the electronic device, and
      in response to a determination that the position of contact has been made by the thumb of the hand determined to be holding the electronic device:
         determine an angle of the thumb with respect to the touch screen based upon a deviation of a shape of the position of contact from a circular shape, and
         provide a correction factor for the position of contact based on the angle.

2. The system of claim 1, wherein the processor further facilitates the execution of the computer executable instructions to infer a physical disability of the user based on the presence information and adjusts a mapping of a soft key to a position that accommodates the inferred physical disability.

3. The system of claim 1, wherein the processor further facilitates the execution of the computer executable instructions to adjust a mapping of a soft key to a position based on the presence information selected to urge the hand of the user holding the electronic device to an unnatural holding position when engaging the soft key.

4. The system of claim 1, wherein the correction factor is an adjustment to the position of contact relative to a soft key mapped to the touch screen.

5. The system of claim 1, wherein the processor further facilitates the execution of the computer executable instructions to:
   identify another position of contact with the touch screen;
   determine whether the other position of contact has been made by another thumb of another hand determined to be holding the electronic device concurrently with the hand; and
   in response to determining that the other position of contact has been made by the other thumb of the other hand determined to be holding the electronic device concurrently with the hand:
      divide the touch screen into a plurality of zones;
      associate the correction factor with a first zone of the plurality of zones, and
      associate another correction factor with a second zone of the plurality of zones.

6. The system of claim 1, wherein the correction factor is a shift in location of display of at least one item on the touch screen to a location wherein the at least one item is substantially unobstructed from display by the thumb.

7. The system of claim 1, wherein the processor further facilitates the execution of the computer executable instructions to map a sliding soft key to a portion of the sensor at an edge of the electronic device at which the thumb of the user is determined to be located and map a tapping soft key to a portion of another sensor at an edge of the electronic device at which a finger of the user is determined to be located opposite to the edge of the electronic device at which the thumb of the user is determined to be located.

8. The system of claim 1, wherein the electronic device is a mobile telephone handset.

9. The system of claim 1, wherein the electronic device is a handheld electronic game system.

10. A method, comprising:
    identifying, by a system including at least one processor, contact between a sensor affixed to an outer surface of a handheld device and at least a portion of a hand of a user;
    determining, by the system, which hand of two hands of the user is being used to hold the handheld device based on the identified contact;
    identifying, by the system, a position of contact with a touch screen of the handheld device;
    determining, by the system, whether the position of contact has been made by a thumb of the hand determined to be holding the handheld device; and
    in response to determining that the position of contact has been made by the thumb of the hand determined to be holding the electronic device:
       determining, by the system, an angle of the thumb with respect to the touch screen based upon a deviation of a shape of the position of contact from a circular shape, and
       providing, by the system, a correction factor for the position of contact based on the angle.

11. The method of claim 10, further comprising:
    inferring, by the system, a physical disability of the user based on the identified contact; and
    adjusting, by the system, a mapping of a soft key to a position that accommodates the inferred physical disability.

12. The method of claim 10, wherein the correction factor is an adjustment to the position of contact relative to a soft key mapped to the touch screen.

13. The method of claim 10, further comprising:
    identifying, by the system, another position of contact with the touch screen;
    determining, by the system, whether the other position of contact has been made by another thumb of another hand determined to be holding the handheld device concurrently with the hand; and in response to determining that the other position of contact has been made by the other thumb of the other hand determined to be holding the electronic device concurrently with the hand:
  providing, by the system, another correction factor for the other position of contact;
  dividing, by the system, the touch screen into a plurality of zones;
  associating, by the system, the correction factor with a first zone of the plurality of zones; and
  associating, by the system, the other correction factor with a second zone of the plurality of zones.

14. The method of claim 10, wherein the correction factor is a shift in location of display of at least one item on the touch screen to a location where the at least one item is not obstructed from display by the thumb.

15. The method of claim 10, further comprising:
  adjusting, by the system, a mapping of a soft key to a position based on the identified contacts, wherein the position is selected to move the hand of the user holding the handheld device into a substantially different holding position than a current holding position when engaging the soft key.

16. A non-transitory computer-readable medium having instructions stored thereon that, in response to execution, cause a handheld device to perform operations, comprising:
  obtaining presence information relating to presence of at least a portion of at least one hand of a user on an exterior surface of the handheld device;
  determining which hand of two hands of the user is being used to hold the handheld device based on the presence information;
  identifying a point of contact with a touch screen of the handheld device;
  determining whether the point of contact has been made by a thumb of the hand determined to be holding the handheld device; and
  in response to determining that the point of contact has been made by the thumb of the hand determined to be holding the electronic device:
    determining an angle of the thumb with respect to the touch screen based upon a deviation of a shape of the position of contact from a circular shape, and
    providing a correction factor for the position of contact based on the angle.

* * * * *